US010328392B2

United States Patent
Yaeger et al.

(10) Patent No.: US 10,328,392 B2
(45) Date of Patent: Jun. 25, 2019

(54) PLEATED, TAPERED, AND SPIRAL-WOUND CROSS-FLOW FILTER ELEMENT

(71) Applicants: Scott P. Yaeger, La Porte, IN (US); Walter E. Yaeger, La Porte, IN (US)

(72) Inventors: Scott P. Yaeger, La Porte, IN (US); Walter E. Yaeger, La Porte, IN (US)

(*) Notice: Subject to any disclaimer, the term of this patent is extended or adjusted under 35 U.S.C. 154(b) by 188 days.

(21) Appl. No.: 15/378,563

(22) Filed: Dec. 14, 2016

(65) Prior Publication Data
US 2018/0161729 A1    Jun. 14, 2018

(51) Int. Cl.
B01D 63/10 (2006.01)
B01D 63/14 (2006.01)

(52) U.S. Cl.
CPC ......... B01D 63/103 (2013.01); B01D 63/106 (2013.01); B01D 63/14 (2013.01); *B01D 2315/10* (2013.01)

(58) Field of Classification Search
CPC .............. B01D 2315/10; B01D 63/103; B01D 63/106; B01D 63/14
See application file for complete search history.

(56) References Cited

U.S. PATENT DOCUMENTS

| 3,872,014 A | 3/1975 | Schell |
| 4,430,223 A | 2/1984 | Miyakawa et al. |
| 4,476,022 A | 10/1984 | Doll |
| 5,204,002 A | 4/1993 | Belfort et al. |
| 5,460,720 A | 10/1995 | Schneider |
| 8,454,829 B2 | 6/2013 | Yaeger |
| 9,452,390 B2 | 9/2016 | Yaeger |
| 2009/0314713 A1* | 12/2009 | Shelby .................. B01D 63/10 210/636 |

FOREIGN PATENT DOCUMENTS

EP     0 282 045 A1    9/1988
WO    WO 2014/186694 A1    11/2014

OTHER PUBLICATIONS

International Search Report and Written Opinion of the International Searching Authority for International Application No. PCT/US2017/061025 dated Jan. 22, 2018.

* cited by examiner

*Primary Examiner* — John Kim
(74) *Attorney, Agent, or Firm* — McNees Wallace & Nurick LLC

(57) ABSTRACT

Pleated, tapered, and spiral-wound cross-flow filter elements are described. The filter elements have pleated and tapered membrane leaves. The pleated and tapered membrane leaves maintain retentate fluid velocity in high permeate flux applications.

22 Claims, 24 Drawing Sheets

PLEATED, TAPERED, AND SPIRAL-WOUND CROSS-FLOW FILTER ELEMENT

BACKGROUND OF THE INVENTION

The information described in this background section is not admitted to be prior art.

Filters generally operate in one of two modes: dead-end or cross-flow. In dead-end filtration, the feed fluid to be filtered flows in a direction generally perpendicular to the surface of the filtration medium, for example, a semi-permeable membrane or a granular media bed. Dead-end filtration can be effective in applications with low concentrations of particles or other materials to be removed from the feed fluid or in applications where the packing tendency of the material retained by the filtration medium (i.e., the retentate) does not produce a large pressure drop across the filter medium. Typical industrial uses of dead-end filtration include municipal water treatment and food and beverage applications such as the filtration of beer, wine, and other beverages.

Many industrial process streams contain high concentrations of particles, solutes, or other materials to be removed which, in many cases, rapidly foul dead-end filtration media, thereby increasing back pressure and decreasing filtration rate. Dead-end filtration techniques are therefore industrially impractical in such applications. However, cross-flow filtration techniques can be employed in such applications to maintain industrially acceptable filtration rates and periods of operation. In cross-flow filtration, the feed fluid to be filtered flows in a direction generally parallel to the surface of a semi-permeable membrane—i.e., tangentially to the filtration membrane. As a portion of the feed fluid passes through the filtration membrane and becomes the permeate stream, particles, solutes, or other materials are concentrated in the feed fluid on the feed side of the filtration membrane which becomes the retentate stream.

Cross-flow filtration operates according to theoretical principles derived from Fick's law of diffusion. The feed stream flows through a cross-flow filter at a pressure, concentration, or other physical or chemical differential between the feed/retentate stream and the permeate stream on the opposite side of the filtration membrane. Particles, solutes, or other materials which are smaller than the filtration membrane pore size pass through the membrane as filtrate in the portion of the feed fluid that forms the permeate stream. Some of the particles, solutes, or other materials in the feed stream become trapped in or on the filtration membrane as retentate, while the balance of the feed stream flows across the filtration membrane on the feed side, without passing through the membrane or becoming trapped in or on the membrane, and forms the retentate stream. The retentate stream exiting a cross-flow filter (i.e., the unfiltered portion of the feed stream) is maintained separate from the permeate stream exiting the cross-flow filter, and may be recycled back through the filter, fed to separate downstream filters for additional filtration, fed to other unit operations, or collected, as appropriate for particular applications.

Cross-flow filters may be used to filter feed streams containing particles, solutes, or other materials that would rapidly "blind" or otherwise foul dead-end filters. "Blinding" is an accumulation of retentate on a filtration membrane that fouls and/or reduces the effectiveness of a filter. In cross-flow filtration, the tangential motion of the bulk fluid across the filtration membrane can mechanically dislodge retentate materials from the membrane surface and the tangential feed flow can transport the dislodged and/or otherwise concentrated retentate materials out of the filter. Consequently, a cross-flow filter can operate in a continuous mode for long periods of operation with decreased blinding at relatively high solids load compared to dead-end filters.

Cross-flow filtration membranes can be produced in tubular, flat sheet, spiral-wound, and hollow fiber configurations. Additionally, cross-flow filtration membranes can be produced with pore sizes ranging from less than 10 Angstroms (reverse osmosis membranes) to greater than 10 micrometers (conventional filtration membranes), and include nanofiltration membranes 1-10 nanometer pore sizes), ultrafiltration membranes (~10-100 nanometer pore sizes), and microfiltration membranes (~0.1-10 micrometer pore sizes).

SUMMARY OF THE INVENTION

This specification generally relates to pleated, tapered, and spiral-wound cross-flow filter elements. This specification also relates to cross-flow filters comprising pleated, tapered, and spiral-wound filter elements. This specification also relates to filtration processes comprising the use of cross-flow filters comprising pleated, tapered, and spiral-wound filter elements. This specification also relates to filtration systems comprising a cross-flow filter comprising a pleated, tapered, and spiral-wound filter element.

In one example, a spiral-wound cross-flow filter element comprises a permeate tube and a pleated filtration membrane attached to the permeate tube. The pleated filtration membrane comprises a plurality of leaves circumferentially spaced around the permeate tube and spiral-wound around the permeate tube in a uniform direction. Each leaf of the plurality of leaves comprises an inlet edge, an outlet edge, a tapered distal edge extending between the inlet edge and the outlet edge, and a proximal end located adjacent to the permeate tube and comprising two folded proximal edges extending between an inlet end of the pleated filtration membrane and an outlet end of the pleated filtration membrane. The length of the inlet edge of each leaf is greater than the length of the outlet edge of the leaf.

In another example, a spiral-wound cross-flow filter element comprises a permeate tube and a pleated filtration membrane welded to the permeate tube. The pleated filtration membrane comprises a plurality of leaves circumferentially spaced around the permeate tube and spiral-wound around the permeate tube in a uniform direction. Each leaf of the plurality of leaves comprises a welded inlet edge, a welded outlet edge, a welded and tapered distal edge extending between the welded inlet edge and the welded outlet edge, and a proximal end located adjacent to the permeate tube and comprising two folded proximal edges extending between an inlet end of the pleated filtration membrane and an outlet end of the pleated filtration membrane. The length of the welded inlet edge of each leaf is greater than the length of the welded outlet edge of the leaf.

In another example, a cross-flow filter comprises a housing, a permeate tube located within the housing, and a pleated filtration membrane attached to the permeate tube and located between the permeate tube and the housing. The pleated filtration membrane comprises a plurality of leaves circumferentially spaced around the permeate tube and spiral-wound around the permeate tube in a uniform direction. Each leaf of the plurality of leaves comprises an inlet edge, an outlet edge, a tapered distal edge extending between the inlet edge and the outlet edge, and a proximal end located adjacent to the permeate tube and comprising two folded proximal edges extending between an inlet end of the pleated filtration membrane and an outlet end of the pleated filtration membrane. The length of the inlet edge of each leaf is greater than the length of the outlet edge of the leaf.

It is understood that the invention described in this specification is not necessarily limited to the examples summarized in this Summary.

BRIEF DESCRIPTION OF THE DRAWINGS

Various features and characteristics of the invention described in this specification may be better understood by reference to the accompanying figures (not necessarily to scale), in which.

The reader will appreciate the foregoing features and characteristics, as well as others, upon considering the following detailed description of the invention according to this specification.

DETAILED DESCRIPTION OF THE INVENTION

In this specification, including the claims, spatial terms (e.g., top, bottom, vertical, horizontal, above, below, over, under, and the like) used to describe the relative orientation, location, or positioning of various components are not to be construed as limited to any specific frame of reference, unless the context dictates otherwise. In this specification, including the claims, the term "proximal" refers to a region of a described component located closer to a permeate tube in a spiral-wound cross-flow filter element, and the term "distal" refers to a region of the described component located farther from a permeate tube in a spiral-wound cross-flow filter element. For example, the terms "proximal" and "distal" generally refer to opposed ends along a radial direction, including as spiral-wound, relative to a permeate tube having a circular cross-section. Additionally, in this specification, including the claims, the terms "inlet" and "outlet" refer to the generally opposed ends of a spiral-wound cross-flow filter element, or sub-component thereof, relative to the bulk tangential flow of fluid through the filter element.

Figure 1A:
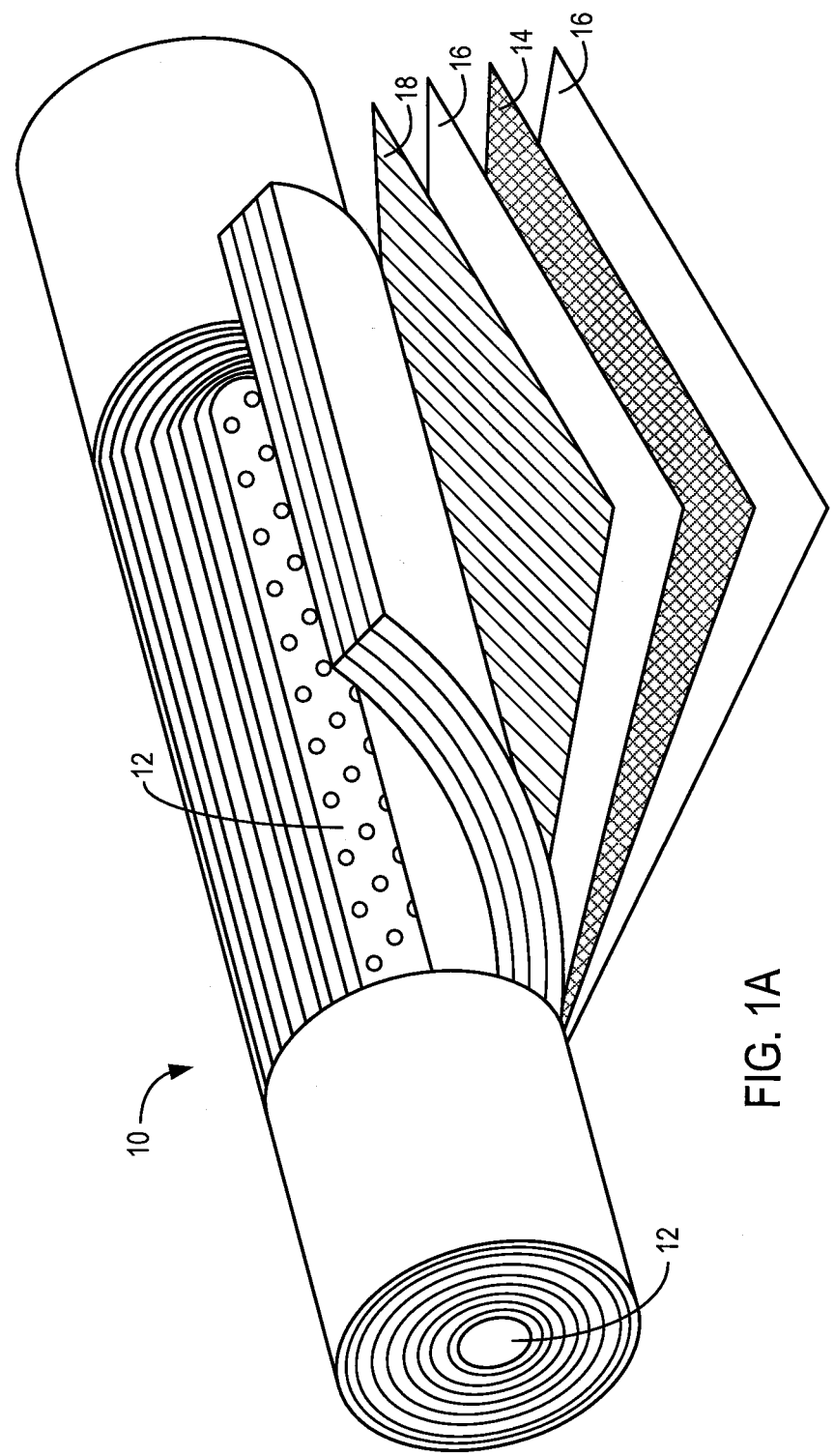
FIG. 1A is a perspective view schematic diagram, partially in cross-section, of a single-leaf spiral-wound cross-flow filter element.
Figure 1B:
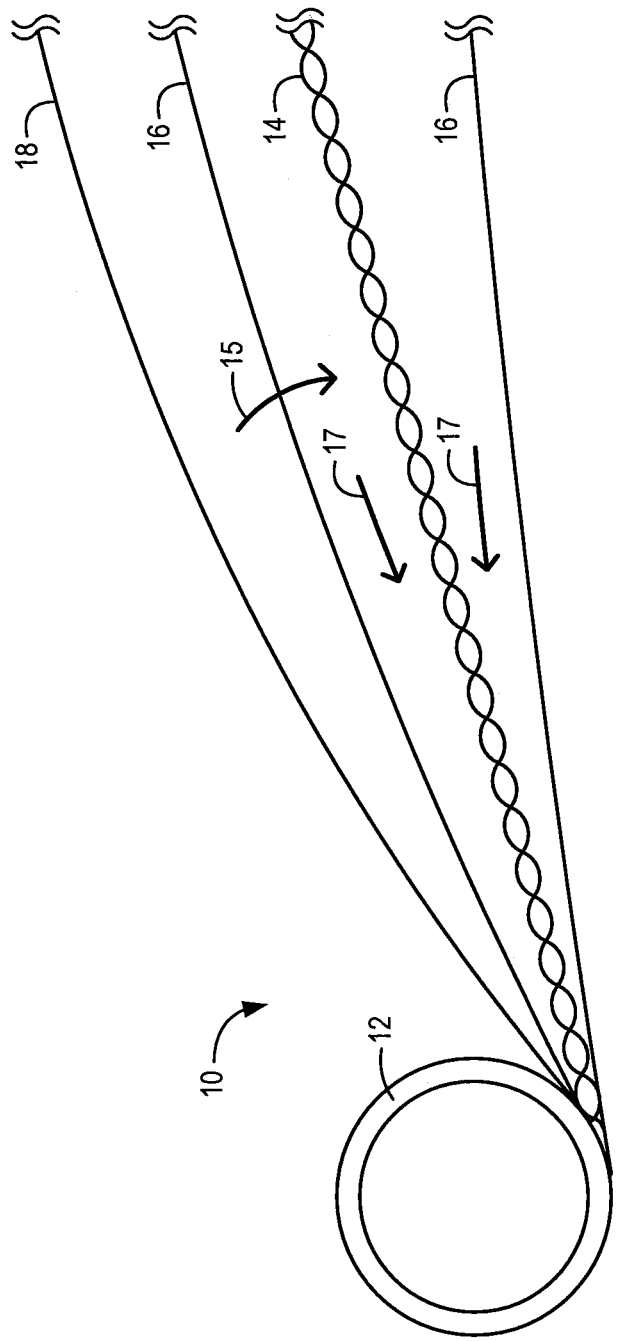
FIG. 1B is a side view schematic diagram of a single-leaf spiral-wound cross-flow filter element.
Figure 1C:
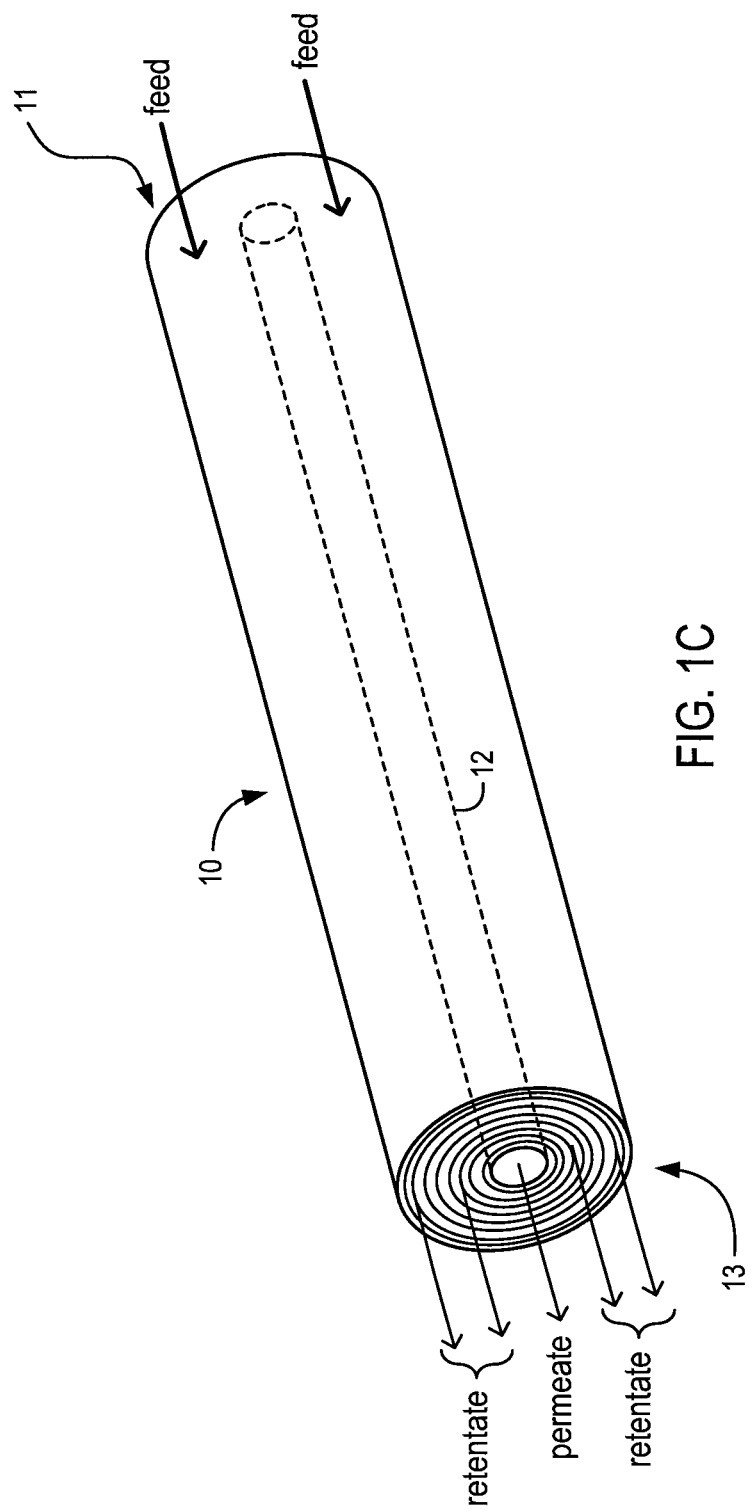
FIG. 1C is a perspective view schematic diagram of a single-leaf spiral-wound cross-flow filter element showing feed, retentate, and permeate fluid flows through the filter element.

As described above, cross-flow filtration membranes can be provided in spiral-wound filter elements. Referring to FIGS. 1A and 1B, a spiral-wound cross-flow filter element 10 comprises a porous permeate tube 12 and layers of feed channel spacer material 18, filtration membrane 16, and permeate collection material 14, which are attached to and spiral-wound around the permeate tube 12. Referring to FIGS. 1B and 1C, fluid to be filtered (feed) flows into the filter element 10 through the inlet end 11, is channeled by the feed channel spacer material 18, and flows tangential to the filtration membrane 16. The permeate tube 12 may be blocked on the inlet end 11 or otherwise isolated from the feed stream. As the feed fluid flows through the filter element 10, a portion transports through the filtration membrane 16, as depicted by arrow 15 in FIG. 1B, and becomes the permeate stream.

After transporting through the filtration membrane 16, the permeate stream flows along a spiral path along the permeate collection material 14 toward the permeate tube 12, as depicted by arrow 17 in FIG. 1B. The permeate stream flows into the permeate tube 12 through its porous wall and ultimately exits the filter element 10 through the permeate tube 12 at the inlet end 11 and/or the outlet end 13 (see FIG. 1C), depending on whether the permeate tube 12 has one open end or two open ends. The portion of the feed that does not pass through the filtration membrane 16 forms the retentate stream, which continues to flow tangential to the filtration membrane 16 and is channeled by the feed channel spacer material 18 out of the filter element 10 through the outlet end 13 (see FIG. 1C).

The spiral-wound cross-flow filter element 10 shown in FIGS. 1A-1C comprises a single spiral-wound membrane leaf formed by the two plies of the filtration membrane 16. This configuration does not effectively utilize the available membrane area for filtration and, therefore, exhibits substantially lower permeate flux through the filtration membrane than equivalently sized filtration membranes in a flat sheet configuration under otherwise identical filtration conditions (e.g., the same feed pressures, retentate pressures, and permeate velocities). The present inventors determined that the exit region of the membrane leaf, which is adjacent to and immediately upstream of the porous permeate tube, establishes a permeate flow restriction that increases permeate back pressure and reduces permeate flux through the entire membrane.

In order to address this problem, the present inventors developed pleated and spiral-wound cross-flow filter elements that comprise a plurality of shorter membrane leaves, which can be welded instead of glued, thereby maximizing the membrane area available for permeate flux while simultaneously increasing the number of permeate exit areas (one for each leaf), and thus the total permeate exit area, in each filter element. See U.S. Pat. Nos. 8,454,829 B2 and 9,452,390 B2, which are each incorporated-by-reference into this specification. Pleated and spiral-wound cross-flow filter elements comprising a plurality of shorter (e.g., having a ratio of leaf height to spiral diameter of less than or equal to 3) and welded (as opposed to glued) leaves exhibit decreased permeate back pressure and increased permeate flux through the filtration membrane. Moreover, pleated, welded, and spiral-wound cross-flow filter elements comprising a plurality of shorter leaves unexpectedly exhibit substantially higher permeate flux rates than filter elements comprising equivalently sized filtration membranes in spiral-wound single-leaf configurations and pleated, multiple-leaf configurations with fewer leaves of relatively larger size.

However, the high permeate flux rates of pleated, welded, and spiral-wound cross-flow filter elements can create a different technical problem. As the permeate flux passing through the filtration membrane increases, the volumetric flowrate of the retentate stream flowing between the leaves of the pleated filter element decreases. In filter elements in which the size of the leaves is constant along their inlet-to-outlet length, the area for feed flow and retentate flow is also constant along the length of the filter element and, therefore, the decrease in volumetric flow rate on the feed and retentate side of the filtration membrane causes a corresponding decrease in fluid velocity on the feed and retentate side of the filtration membrane. This can be problematic because slower fluid velocities are less effective at mechanically dislodging retentate materials from the retentate side of the filtration membrane and, therefore, less effective at membrane cleaning and fouling prevention.

Figure 2:
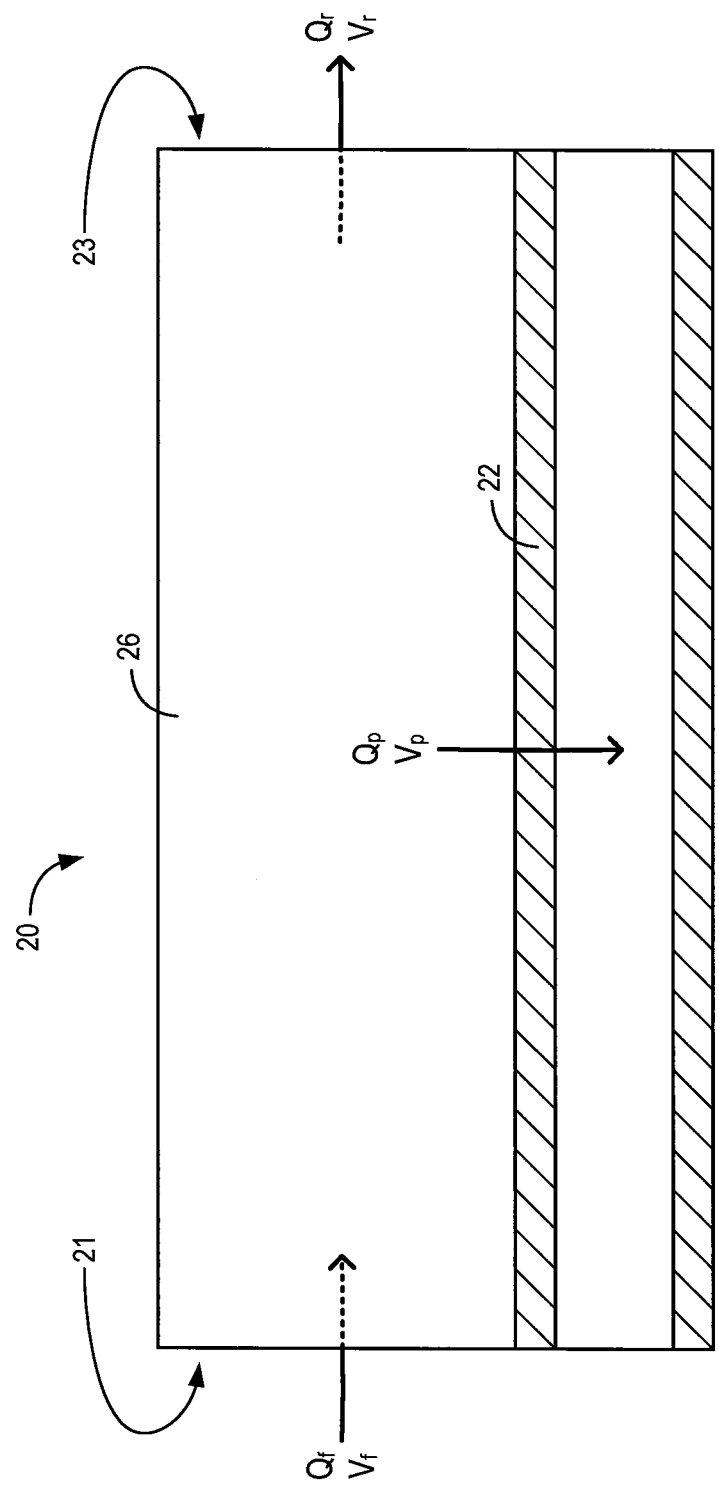
FIG. 2 is a side view cross-sectional schematic diagram of one membrane leaf attached to a permeate tube in a pleated (multiple-leaf) and spiral-wound cross-flow filter element illustrating the feed fluid flow rate ($Q_f$) and velocity ($V_f$), retentate fluid flow rate ($Q_r$) and velocity ($V_r$), and permeate fluid flow rate ($Q_p$) and velocity ($V_p$)

Referring to FIG. 2, a pleated and spiral-wound cross-flow filter element 20 comprises a membrane leaf 26 attached to a permeate tube 22 (for ease of illustration, only one membrane leaf 26 is shown in an unwound orientation, but it is understood that the pleated and spiral-wound cross-flow filter element 20 can comprise a plurality of leaves 26 circumferentially spaced around the permeate tube 22 and spiral-wound around the permeate tube 22 in a uniform direction, as further described below). Feed fluid flows into the filter element 20 at the inlet end 21 with a feed fluid flow rate ($Q_f$) and a feed fluid velocity ($V_f$). As the feed fluid flows tangential to the membrane leaf 26, a portion of the feed fluid flows through the filtration membrane and creates a permeate flux, and the balance of the feed fluid continues to flow tangential to the membrane leaf 26 and forms the retentate which exits the filter element 20 at the outlet end 23. The permeate flux flows into the permeate tube 22 and establishes a permeate fluid flow rate ($Q_p$) and a permeate fluid velocity ($V_p$). The retentate fluid exits the filter element 20 at the outlet end 23 with a retentate fluid flow rate ($Q_r$) and a retentate fluid velocity ($V_r$).

The volumetric flowrate of the feed stream is equal to the sum of the volumetric flowrates of the retentate and permeate streams ($Q_f=Q_r+Q_p$). An increased $Q_p$ resulting from an increased permeate flux through the filtration membrane causes a decreased $Q_r$ and a decreased $V_r$. As noted above, the decreased $V_r$ can be problematic because it is less effective at membrane cleaning and fouling prevention. For example, assuming the filter element 20 is operating at a 50% recovery rate (defined as $100*Q_p/Q_f$), which can be achieved with the high permeate flux capability of pleated, welded, and spiral-wound cross-flow filter elements, then $Q_r=\frac{1}{2}*Q_f$, and because of the constant area for feed/retentate flow between each leaf, $V_r=\frac{1}{2}*V_f$. In other words, as the feed fluid flows through the filter element 20 and transitions to the retentate stream, the fluid velocity decreases by 50%. Such a large drop in fluid velocity would result in the rapid fouling of the filtration membrane on the feed/retentate side of each leaf 26, particularly toward the outlet end 23. Such a filter element may not be as industrially or commercially useful, notwithstanding the high permeate flux and recovery rate, because of the reduced operational life of the filter element before fouling renders the filter element inoperable.

As described above, the decrease in feed/retentate fluid velocity that occurs as the permeate flux passes through the filtration membrane is caused by the corresponding decrease in feed/retentate volumetric flowrate and the constant area for feed/retentate flow between each leaf in a pleated and spiral-wound cross-flow filter element. If, however, each leaf in a pleated and spiral-wound cross-flow filter element is tapered such that the length of the inlet edge of each leaf is greater than the length of the outlet edge of the leaf, then the area for feed/retentate flow between each leaf decreases along the inlet-to-outlet length of the filter element, thereby providing a flow restriction that compensates for the loss of fluid volume by permeate flux through the filtration membrane and thus maintains the feed/retentate fluid velocity along the inlet-to-outlet length of the filter element. The maintained fluid velocity retains membrane cleaning and fouling prevention effectiveness while simultaneously maintaining increased permeate flux capacity.

Figure 3:
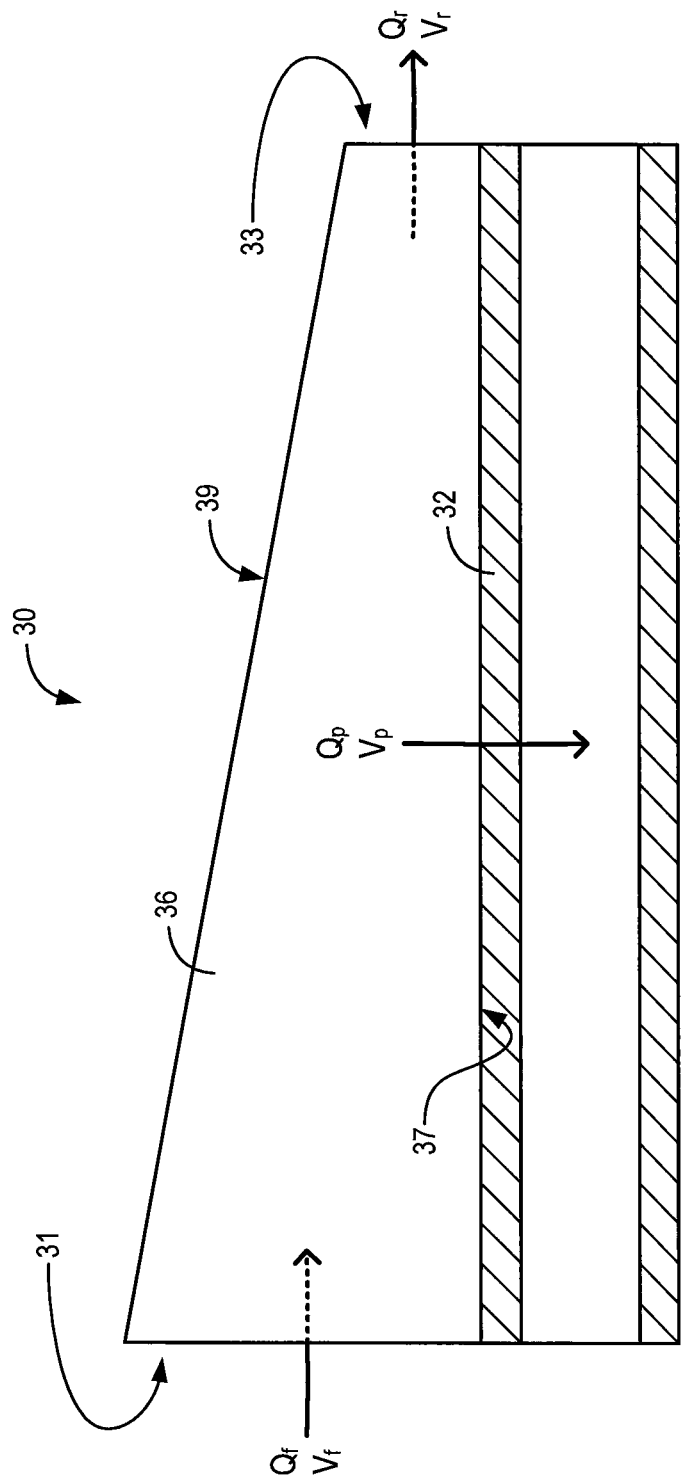
FIG. 3 is a side view cross-sectional schematic diagram of one tapered membrane leaf attached to a permeate tube in a pleated (multiple-leaf), tapered, and spiral-wound cross-flow filter element illustrating the feed fluid flow rate ($Q_f$) and velocity ($V_f$), retentate fluid flow rate ($Q_r$) and velocity ($V_r$), and permeate fluid flow rate ($Q_p$) and velocity ($V_p$)

Referring to FIG. 3, a pleated, tapered, and spiral-wound cross-flow filter element 30 comprises a tapered membrane leaf 36 attached to a permeate tube 32 (for ease of illustration, only one tapered membrane leaf 36 is shown in an unwound orientation, but it is understood that the pleated and spiral-wound cross-flow filter element 30 can comprise a plurality of tapered leaves 36 circumferentially spaced around the permeate tube 32 and spiral-wound around the permeate tube 32 in a uniform direction, as further described below). The tapered membrane leaf 36 comprises a proximal end 37 located adjacent to the permeate tube 32 and a tapered distal edge 39. The tapered distal edge 39 extends between the inlet edge 31 and the outlet edge 33 of the membrane leaf 36. The length of the inlet edge 31 is greater than the length of the outlet edge 33.

Feed fluid flows into the filter element 30 at the inlet end (side corresponding to the inlet edge 31 of the membrane leaf 36) with a feed fluid flow rate ($Q_f$) and a feed fluid velocity ($V_f$). As the feed fluid flows tangential to the membrane leaf 36, a portion of the feed fluid flows through the filtration membrane and creates a permeate flux, and the balance of the feed fluid continues to flow tangential to the membrane leaf 36 and forms the retentate which exits the filter element 30 at the outlet end (side corresponding to the outlet edge 33 of the membrane leaf 36). The permeate flux flows into the permeate tube 32 and establishes a permeate fluid flow rate ($Q_p$) and a permeate fluid velocity ($V_p$). The retentate fluid exits the filter element 30 at the outlet end with a retentate fluid flow rate ($Q_r$) and a retentate fluid velocity ($V_r$).

The area for feed/retentate flow between each membrane leaf 36 decreases along the inlet-to-outlet length of the filter element 30 as a result of the tapered distal edge 39. The decreasing area available for feed/retentate flow compensates for the loss of fluid volume by permeate flux through the filtration membrane and thus maintains the feed/retentate fluid velocity along the inlet-to-outlet length of the filter element 30. The maintained fluid velocity retains membrane cleaning and fouling prevention effectiveness while simultaneously maintaining increased permeate flux capacity.

More specifically, the volumetric flowrate of the feed stream is equal to the sum of the volumetric flowrates of the retentate and permeate streams ($Q_f=Q_r+Q_p$). An increased $Q_p$ resulting from an increased permeate flux through the filtration membrane causes a decreased $Q_r$. However, the flow restriction provided by the tapered distal edge 39 maintains the feed/retentate fluid velocity along the inlet-to-outlet length of the filter element 30 ($V_f=V_r$). For example, assuming the filter element 30 is operating at a 50% recovery rate (defined as $100*Q_p/Q_f$), which can be achieved with the high permeate flux capability of pleated, welded, and spiral-wound cross-flow filter elements, then $Q_r=\frac{1}{2}*Q_f$. However, because of the decreasing area for feed/retentate flow between each leaf along the inlet-to-outlet length of the filter element 30, $V_r \neq \frac{1}{2}*V_f$. Instead, depending on the angle of the tapered edge, $V_r > \frac{1}{2}*V_f$, and, for example, if the length of the inlet edge 31 is two times the length of the outlet edge 33, then $V_r = V_f$.

A pleated, tapered, and spiral-wound cross-flow filter element provides the decreasing area for feed/retentate flow between each leaf that maintains fluid velocity and membrane cleaning and fouling prevention effectiveness while simultaneously maintaining increased permeate flux capacity. Additionally, the tapered distal edge of each leaf simultaneously allows the leaf-to-leaf distance to be maintained, for example, by a feed spacer having an appropriate width depending on the solids content of the fluid to be filtered and the desired recovery rate, which preserves the ability to flow retentate fluid comprising concentrated solids content through the filter element without occlusion or blockage.

Accordingly, the present invention includes a spiral-wound cross-flow filter element comprising a permeate tube and a pleated filtration membrane attached to the permeate tube. The pleated filtration membrane comprises a plurality of leaves circumferentially spaced around the permeate tube and spiral-wound around the permeate tube in a uniform direction. Each leaf of the plurality of leaves comprises an inlet edge and an outlet edge, wherein the length of the inlet edge is greater than the length of the outlet edge. Each leaf also comprises a tapered distal edge extending between the inlet edge and the outlet edge, and a proximal end located adjacent to the permeate tube. The proximal end comprises two folded proximal edges extending between an inlet end of the pleated filtration membrane and an outlet end of the pleated filtration membrane.

Figure 4A:
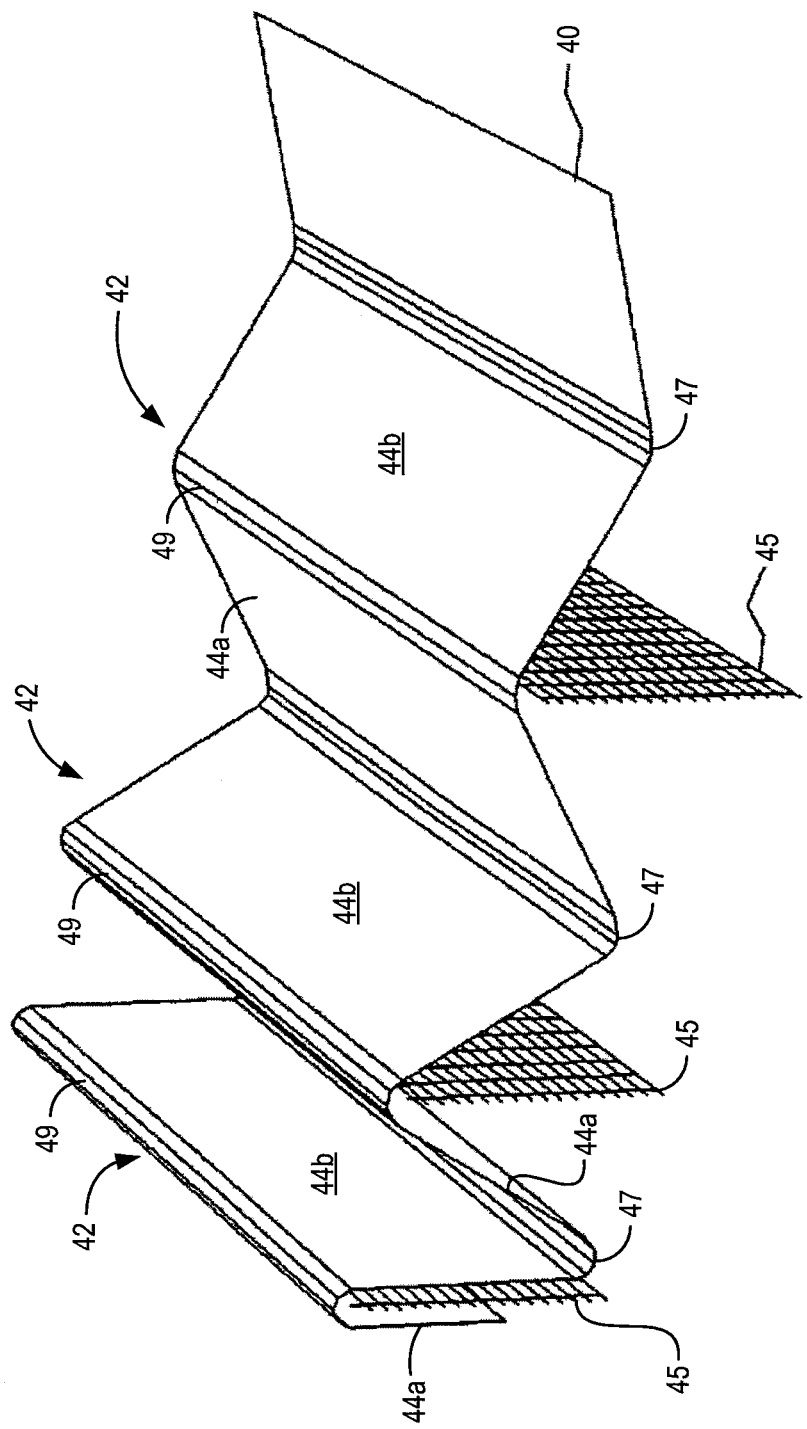
FIG. 4A is a perspective view schematic diagram of a membrane sheet being pleated with permeate spacers positioned within each pleat.

Pleated filtration membranes comprising a plurality of leaves are illustrated in FIGS. 4A-8. Referring to FIG. 4A, a filtration membrane 40 is shown being pleated (i.e., folded) into separate pleats 42. Each pleat 42 comprises two plies (44a, 44b) of the filtration membrane 40 connected by a folded distal edge 49. Each pleat 42 is separated from and connected to immediately adjacent pleats 42 by two folded proximal edges 47. Permeate spacers 45 are located within each pleat 42. The pleats 42 form the plurality of leaves in a pleated, tapered, and spiral-wound cross-flow filter element.

Figure 4B:
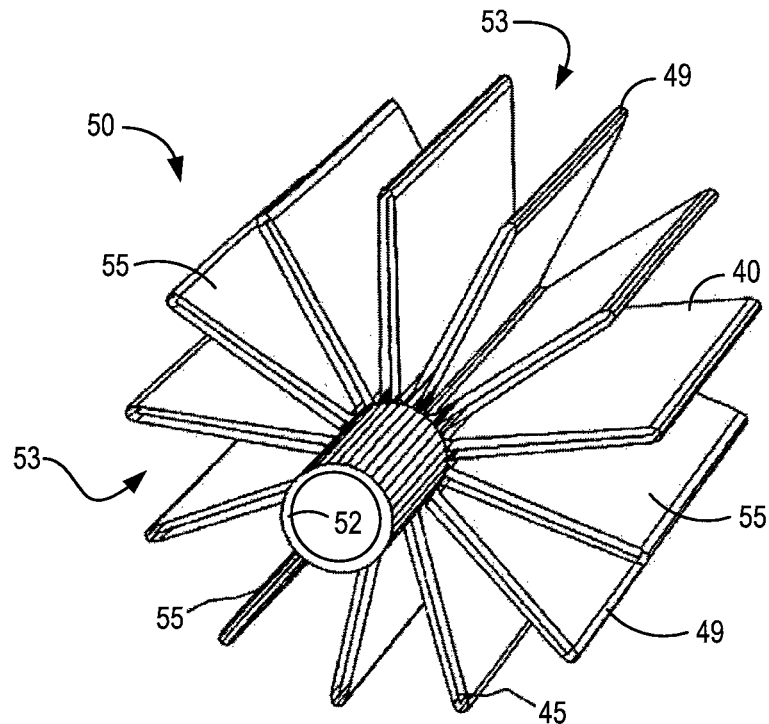
FIG. 4B is a perspective view schematic diagram, partially in cross-section, of a pleated membrane sheet attached to a permeate tube and having permeate spacers positioned within each pleat.
Figure 4C:
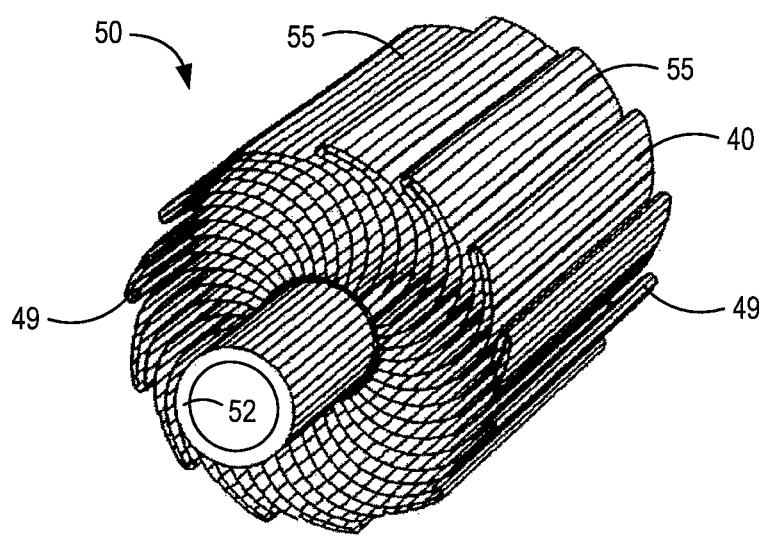
FIG. 4C is a perspective view schematic diagram, partially in cross-section, of a pleated and spiral-wound cross-flow filter element comprising the pleated membrane and permeate spacer configuration shown in FIG. 4B.

Referring to FIGS. 4B and 4C, a pleated and spiral-wound cross-flow filter element 50 comprises a permeate tube 52 and the pleated filtration membrane 40 attached to the permeate tube 52. The pleated filtration membrane 40 comprises a plurality of leaves 55 circumferentially spaced around the permeate tube 52 (see FIG. 4B) and spiral-wound around the permeate tube 52 in a uniform direction (see FIG. 4C). Each leaf 55 comprises an inlet edge and an outlet edge (not shown). Each leaf 55 also comprises a distal edge 49 extending between the inlet edge and the outlet edge. Each leaf 55 also comprises a proximal end opposite the distal edge 49 and located adjacent to the permeate tube 52. The proximal end comprises two folded proximal edges extending between an inlet end and an outlet end of the pleated filtration membrane 40. The pleated filtration membrane 40 is attached to the permeate tube 52 at the inlet end and the outlet end of the folded proximal edges between each leaf 55. The permeate spacers 45 are located within each leaf 55. Although not shown in FIGS. 4B and 4C, it is understood that feed spacers can be located in the inter-leaf spaces 53 between each leaf 55.

Figure 5A:
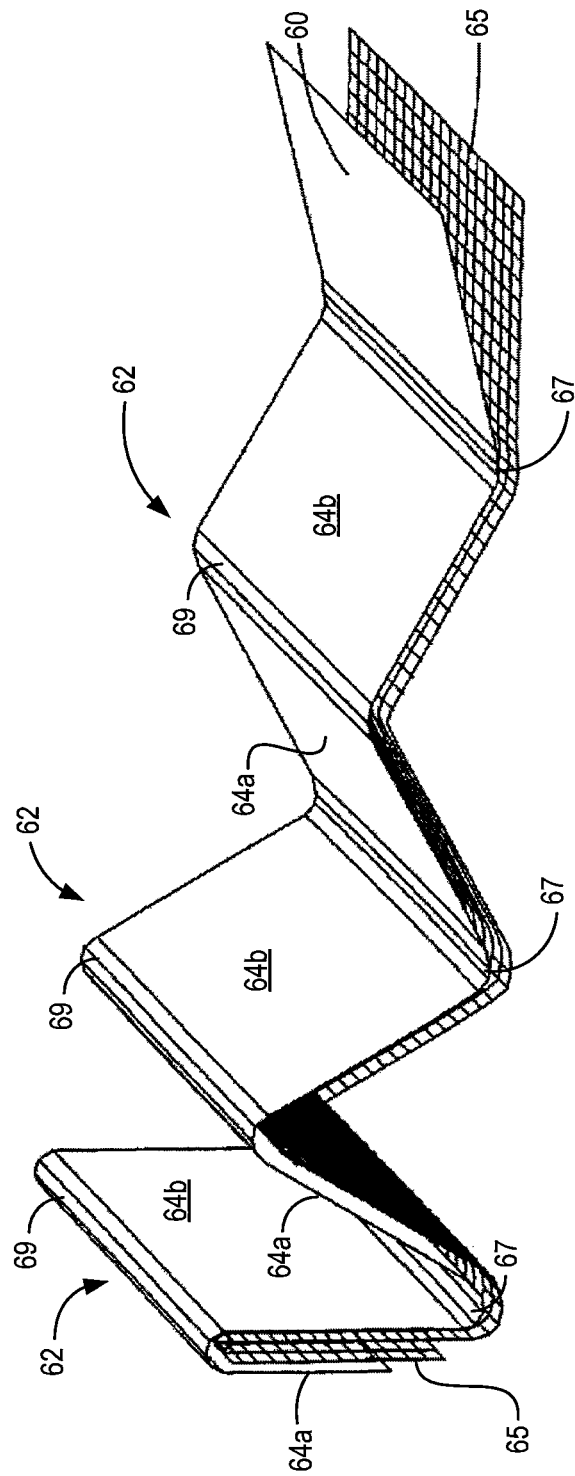
FIG. 5A is a perspective view schematic diagram of a membrane sheet being pleated with an adjacent permeate spacer sheet.

Referring to FIG. 5A, a filtration membrane 60 is shown being pleated (i.e., folded) into separate pleats 62. Each pleat 62 comprises two plies (64a, 64b) of the filtration membrane 60 connected by a folded distal edge 69. Each pleat 62 is separated from and connected to immediately adjacent pleats 62 by two folded proximal edges 67. A sheet of co-extensive permeate spacer material 65 is pleated with the filtration membrane 60 so that two plies of the permeate spacer material 65 are located within each pleat 62. The pleats 62 form the plurality of leaves in a pleated, tapered, and spiral-wound cross-flow filter element.

Figure 5B:
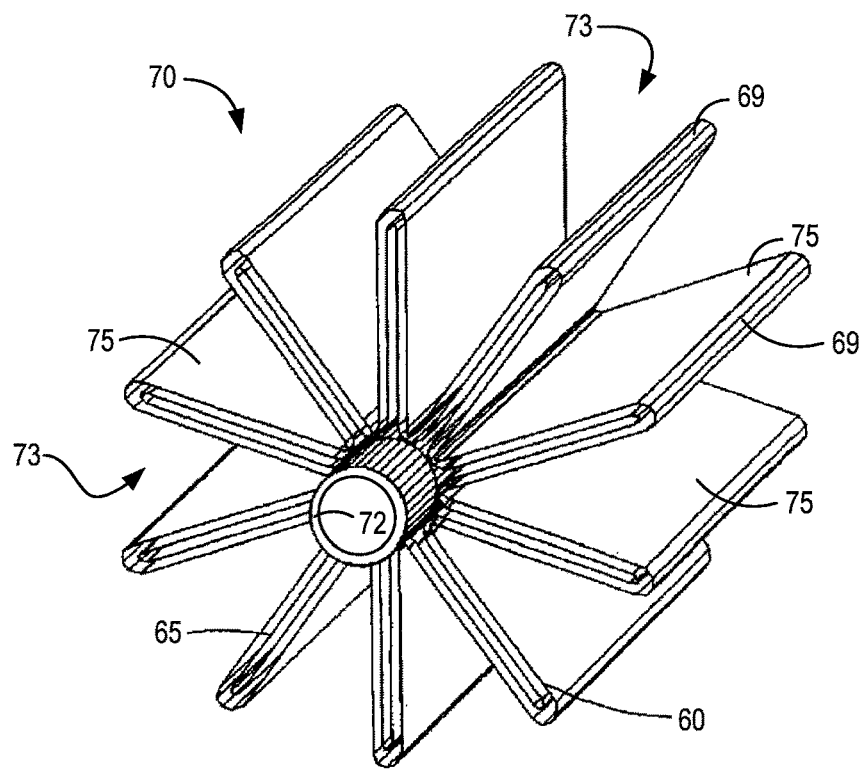
FIG. 5B is a perspective view schematic diagram, partially in cross-section, of a pleated membrane sheet attached to a permeate tube and having pleated permeate spacers positioned within each pleat.
Figure 5C:
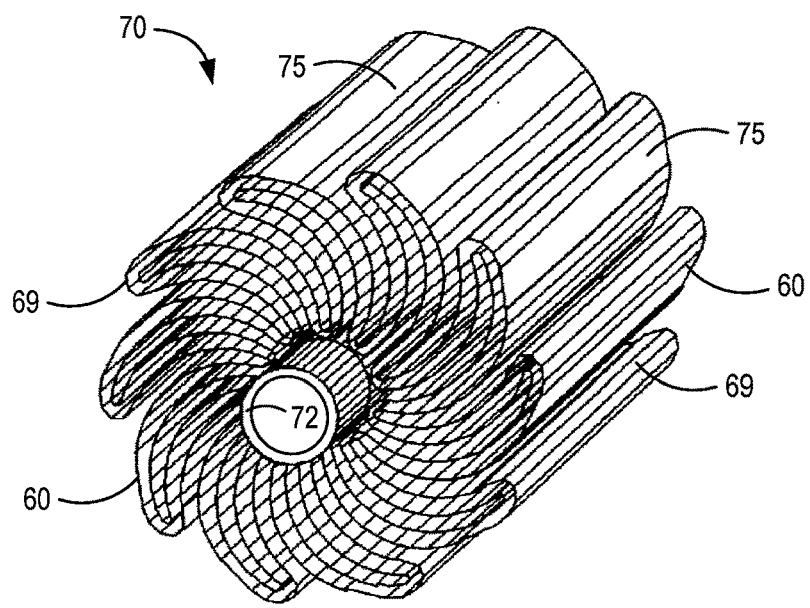
FIG. 5C is a perspective view schematic diagram, partially in cross-section, of a pleated and spiral-wound cross-flow filter element comprising the pleated membrane and pleated permeate spacer configuration shown in FIG. 5B.

Referring to FIGS. 5B and 5C, a pleated and spiral-wound cross-flow filter element 70 comprises a permeate tube 72 and the pleated filtration membrane 60 attached to the permeate tube 72. The pleated filtration membrane 60 comprises a plurality of leaves 75 circumferentially spaced around the permeate tube 72 (see FIG. 5B) and spiral-wound around the permeate tube 72 in a uniform direction (see FIG. 5C). Each leaf 75 comprises an inlet edge and an outlet edge (not shown). Each leaf 75 also comprises a distal edge 69 extending between the inlet edge and the outlet edge. Each leaf 75 also comprises a proximal end opposite the distal edge 69 and located adjacent to the permeate tube 72. The proximal end comprises two folded proximal edges extending between an inlet end and an outlet end of the pleated filtration membrane 60. The pleated filtration membrane 60 is attached to the permeate tube 72 at both the inlet end and the outlet end of the folded proximal edges between each leaf 75. The two plies of permeate spacer material 65 are located within each leaf 75. Although not shown in FIGS. 5B and 5C, it is understood that feed spacers can be located in the inter-leaf spaces 73 between each leaf 75.

Figure 6:
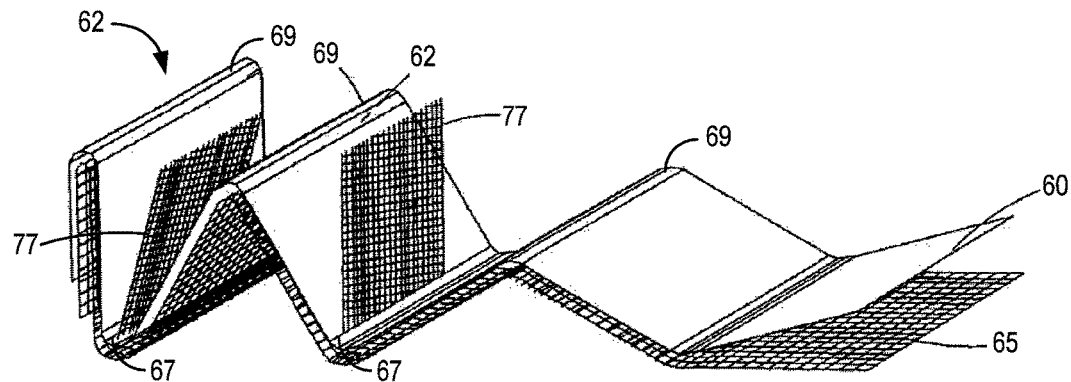
FIG. 6 is a perspective view schematic diagram of a membrane sheet being pleated with an adjacent permeate spacer sheet and feed spacers positioned between each pleat.
Figure 7:
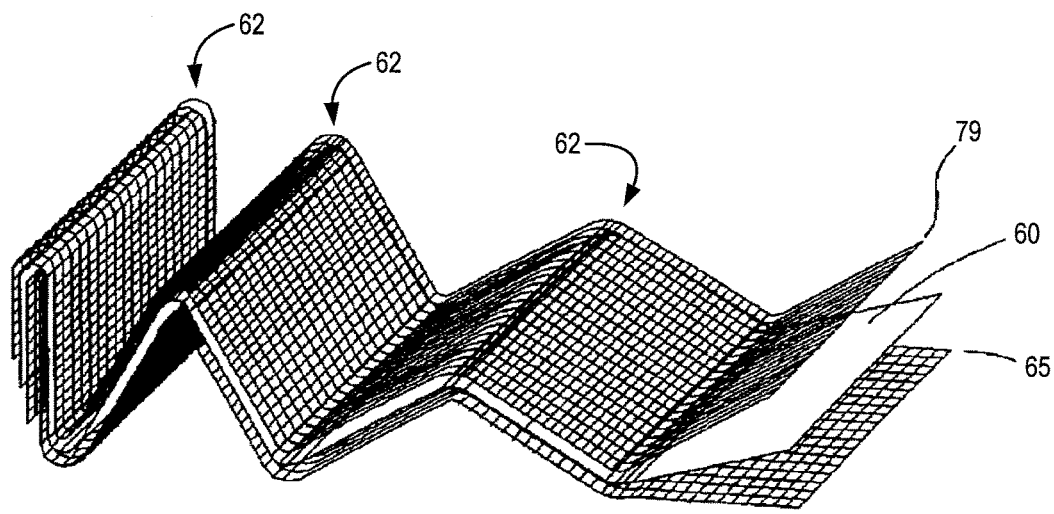
FIG. 7 is a perspective view schematic diagram of a membrane sheet being pleated with an adjacent permeate spacer sheet and an adjacent feed spacer sheet.

Referring to FIG. 6, the filtration membrane 60 and the sheet of co-extensive permeate spacer material 65 are shown being pleated (i.e., folded) into separate pleats 62. Feed spacers 77 are located in the space between each pleat 62. Referring to FIG. 7, the filtration membrane 60 and the sheet of co-extensive permeate spacer material 65 are shown being pleated (i.e., folded) into separate pleats 62. A sheet of co-extensive feed spacer material 79 is pleated with the filtration membrane 60 and the permeate spacer material 65 so that two plies of the feed spacer material 79 are located between each pleat 62. Although not illustrated, is it understood that separate permeate spacers (for example, the permeate spacers 45 shown in FIGS. 4A-4C) can be used in combination with a sheet of co-extensive feed spacer material (for example, the feed spacer material 79 shown in FIG. 7). Likewise, is it understood that separate permeate spacers (for example, the permeate spacers 45 shown in FIGS. 4A-4C) can be used in combination with separate feed spacers (for example, the feed spacers 77 shown in FIG. 6).

For ease of illustration, the pleated filtration membranes comprising a plurality of leaves shown in FIGS. 4A-7 are not shown with tapered distal edges. However, it is understood that each leaf shown in FIGS. 4A-7 can be tapered by diagonally cutting the leaves at an angle from the inlet end to the outlet end and bonding together the two tapered distal edges of the two plies of the membrane material to form a single tapered distal edge of the leaf.

Figure 8:
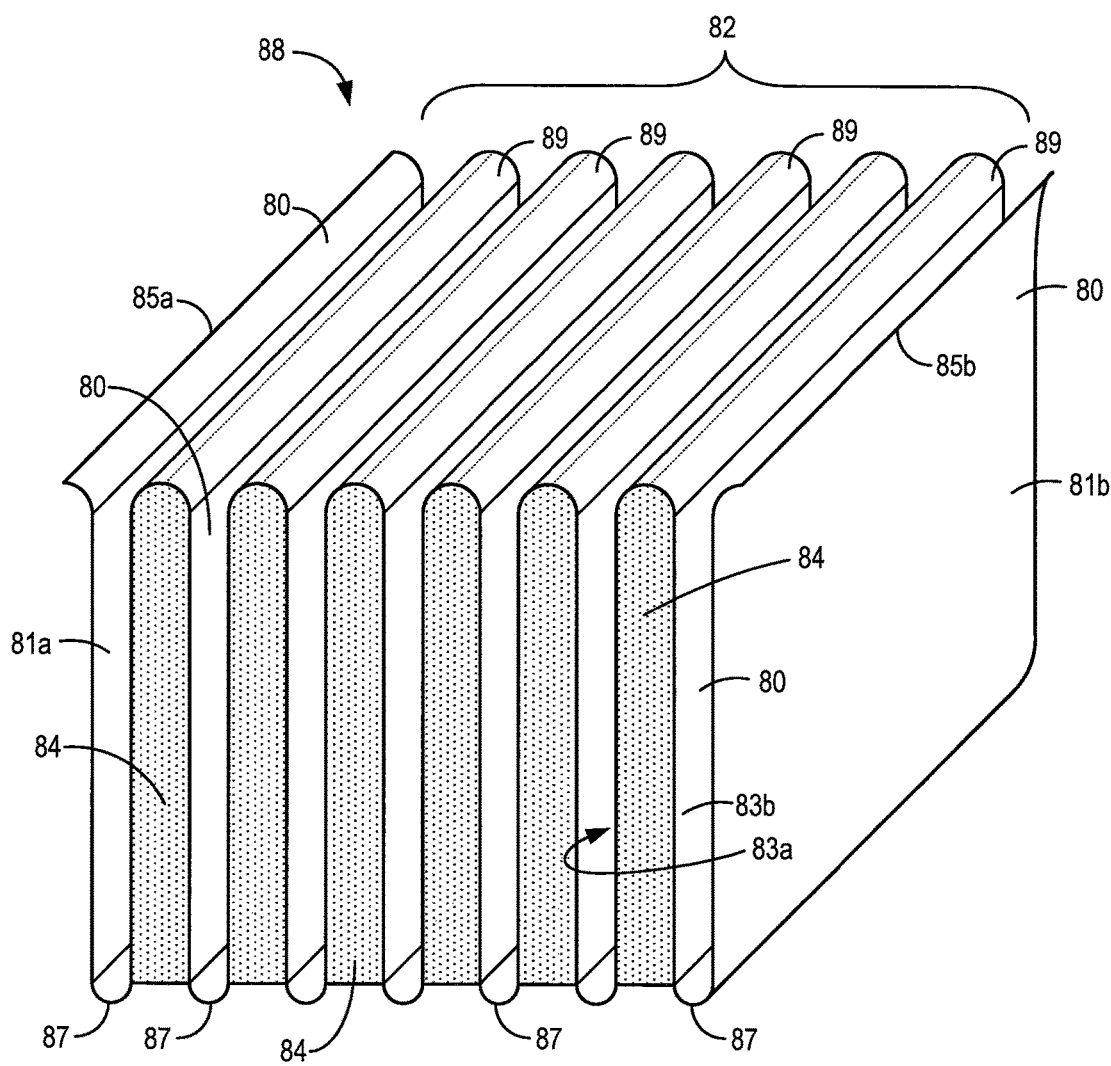
FIG. 8 is a perspective view schematic diagram of a pleated membrane sheet in which the two inlet edges of each pleat are bonded together, and the two outlet edges of each pleat (not shown) are also bonded together, thereby forming a plurality of membrane leaves, each leaf comprising one bonded inlet edge and one bonded outlet edge (not shown)

Referring to FIG. 8, a pleated filtration membrane 80 forms a pleat pack 88 comprising a plurality of leaves 82 and two half-leaves (81a, 81b). Each leaf 82 comprises two plies (83a, 83b) of the pleated filtration membrane 80 connected by a folded distal edge 89. Each leaf 82 is separated from and connected to immediately adjacent leaves 82 by two folded proximal edges 87. Each leaf 82 comprises an inlet edge 84 and an outlet edge (not shown) opposite the inlet edge 84. The inlet edge 84 and the outlet edge comprise a bond along the respective edges sealing together the two constituent plies forming each leaf 82 in the pleat pack 88. Thus, each leaf 82 comprises a hollow internal space defined by the two constituent plies of the pleated filtration membrane 80, the folded distal edge 89, the bonded inlet edge 84, and the bonded outlet edge. As described above, a permeate spacer may be located within the hollow internal space of each leaf 84. The folded distal edge 89 extends between the bonded inlet edge 84 and the bonded outlet edge. Each leaf 82 also comprises a proximal end opposite the distal edge 89. The proximal end of each leaf comprises the two folded proximal edges 87 extending between the inlet end and the outlet end of the pleat pack 88.

Figure 9A:
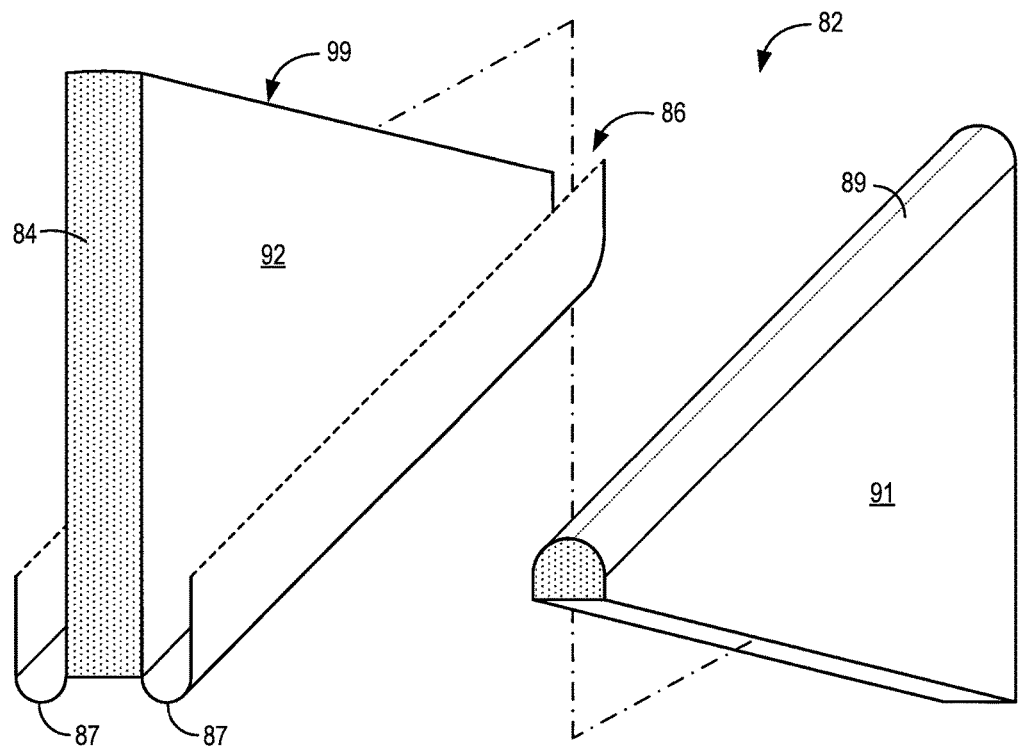
FIG. 9A is a perspective view schematic diagram of one membrane leaf of a pleated (multiple-leaf) and spiral-wound cross-flow filter element, viewed from the inlet end, and showing a diagonal cut across the inlet-to-outlet length of the leaf, thereby forming a tapered and bonded distal edge, and wherein the leaf further comprises one bonded inlet edge and one bonded outlet edge (not shown)
Figure 9B:
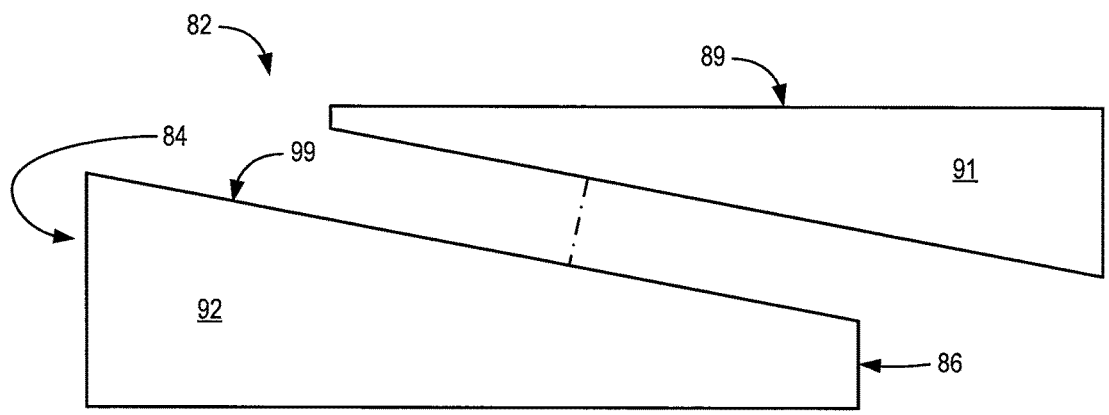
FIG. 9B is a side view schematic diagram of the one membrane leaf shown in FIG. 9A.

Referring to FIGS. 9A and 9B, one leaf 82 of the pleat pack 88 shown in FIG. 8 is diagonally cut across the inlet-to-outlet length of the leaf 82, thereby forming a tapered leaf 92 comprising a tapered distal edge 99 extending between the bonded inlet edge 84 and the bonded outlet edge 86. The length of the bonded inlet edge 84 is greater than the length of the bonded outlet edge 86 as a result of the tapered distal edge 99. The diagonal cut across the inlet-to-outlet length of the leaf 82 produces a separated portion 91 that includes the folded distal edge 89.

Like the bonded inlet edge 84 and the bonded outlet edge 86, the tapered distal edge 99 can be bonded—i.e., comprise a bond along the tapered distal edge sealing together the two constituent plies of the pleated filtration membrane 80 forming each leaf 92 in the pleat pack. The leaf 92 can therefore comprise a bond along at least a portion of the inlet edge 84, a bond along at least a portion of an outlet edge 86, and a bond along the entire length of the tapered distal edge 99, wherein the bonds seal together adjacent plies of the pleated filtration membrane 80 forming each leaf 92 in the pleat pack. The bonds along the inlet edge 84 and the outlet edge 86 can extend along substantially the entire lengths of the edges, from the intersections with the tapered distal edge 99 to the proximal end of the leaf, where the two constituent plies of the pleated filtration membrane 80 forming each leaf 92 in the pleat pack also form the two folded proximal edges 87 shared with the immediately adjacent leaves.

The bonded inlet edge 84, the bonded outlet edge 86, and the tapered and bonded distal edge 99 provide the leaf 92 with a fluid impervious seal around the hollow internal space of the leaf 92. The bonded edges 84, 86, and 99 can be formed using an adhesive, for example, to glue together the two constituent plies of each pleat of the pleated filtration membrane 80 forming the pleat pack 88. In some examples, the bonds do not comprise an adhesive. In some examples, the bonds comprise welds, such as, for example, ultrasonic welds, thermal welds, infrared welds, radio frequency welds, microwave welds, laser welds, or hot air welds.

The constituent materials of construction of the components of the pleated, tapered, and spiral-wound cross-flow filter elements described in this specification may comprise polymeric materials. For example, filtration membranes can be made from polyvinylidene difluoride (PVDF), polypropylene, polyethylene, polyethersulfone, polysulfone, polyacrylonitrile, polyesters (e.g., polyethylene terephthalate—PET), polyamides (e.g., nylons) poly(ethylene-chlorotrifluoroethylene) (ECTFE), fluorinated poly (ethylene-propylene) (FEP), poly(perfluoroalkoxy alkanes) (PFA), polytetrafluoroethylene (PTFE), polyetheretherketone (PEEK), and polycarbonates. Permeate tubes, permeate spacers, feed spacers, anti-telescoping devices, housings, and end caps likewise can be made from such polymeric materials or other types of materials including, for example, metals, alloys, ceramics, and composite material (e.g., fiber-reinforced plastics).

Accordingly, the pleated, tapered, and spiral-wound cross-flow filter elements and filters described in this specification can be made using adhesive bond and attachments or adhesive-free bonds and attachments producing by welding together the constituent materials (for example, by ultrasonic welding, thermal welding, infrared welding, radio frequency welding, microwave welding, laser welding, or hot air welding). For instance, in one example, a spiral-wound cross-flow filter element comprises a permeate tube and a pleated filtration membrane welded to the permeate tube. The pleated filtration membrane comprises a plurality of leaves circumferentially spaced around the permeate tube and spiral-wound around the permeate tube in a uniform direction. Each leaf of the plurality of leaves comprises a welded inlet edge and a welded outlet edge, wherein the length of the welded inlet edge is greater than the length of the welded outlet edge. Each leaf further comprises a welded and tapered distal edge extending between the welded inlet edge and the welded outlet edge. Each leaf further comprises a proximal end located adjacent to the permeate tube and comprising two folded proximal edges extending between an inlet end of the pleated filtration membrane and an outlet end of the pleated filtration membrane. The welded inlet edge, the welded outlet edge, and the welded and tapered distal edge of each leaf can comprise ultrasonic welds, thermal welds, infrared welds, radio frequency welds, microwave welds, laser welds, or hot air welds. The pleated filtration membrane can be welded to the permeate tube at the inlet end and/or the outlet end of the folded proximal edges between each leaf, and the welds can comprise any of those described above.

Figure 10A:
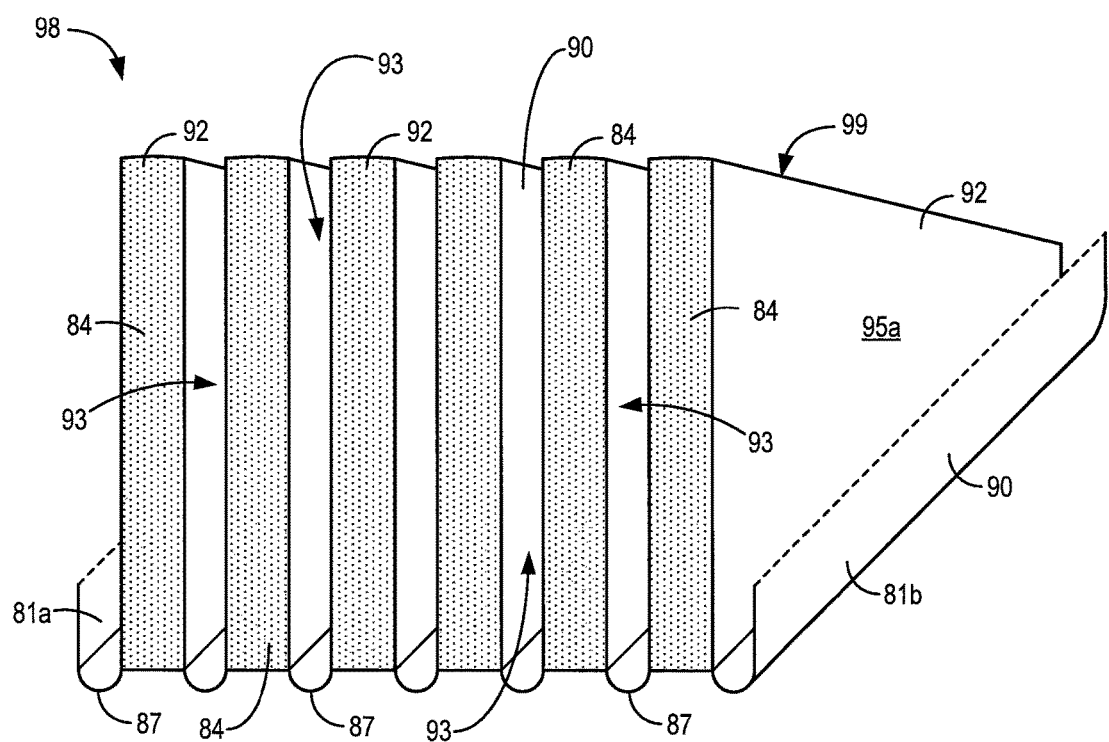
FIG. 10A is a perspective view schematic diagram of a pleated membrane sheet, viewed from the inlet end, in which the two inlet edges of each pleat are bonded together, and the two outlet edges of each pleat (not shown) are also bonded together, thereby forming a plurality of membrane leaves, each leaf comprising one bonded inlet edge and one bonded outlet edge (not shown), and in which the distal edges of the leaves are bonded and tapered, thereby forming a plurality of tapered membrane leaves.
Figure 10B:
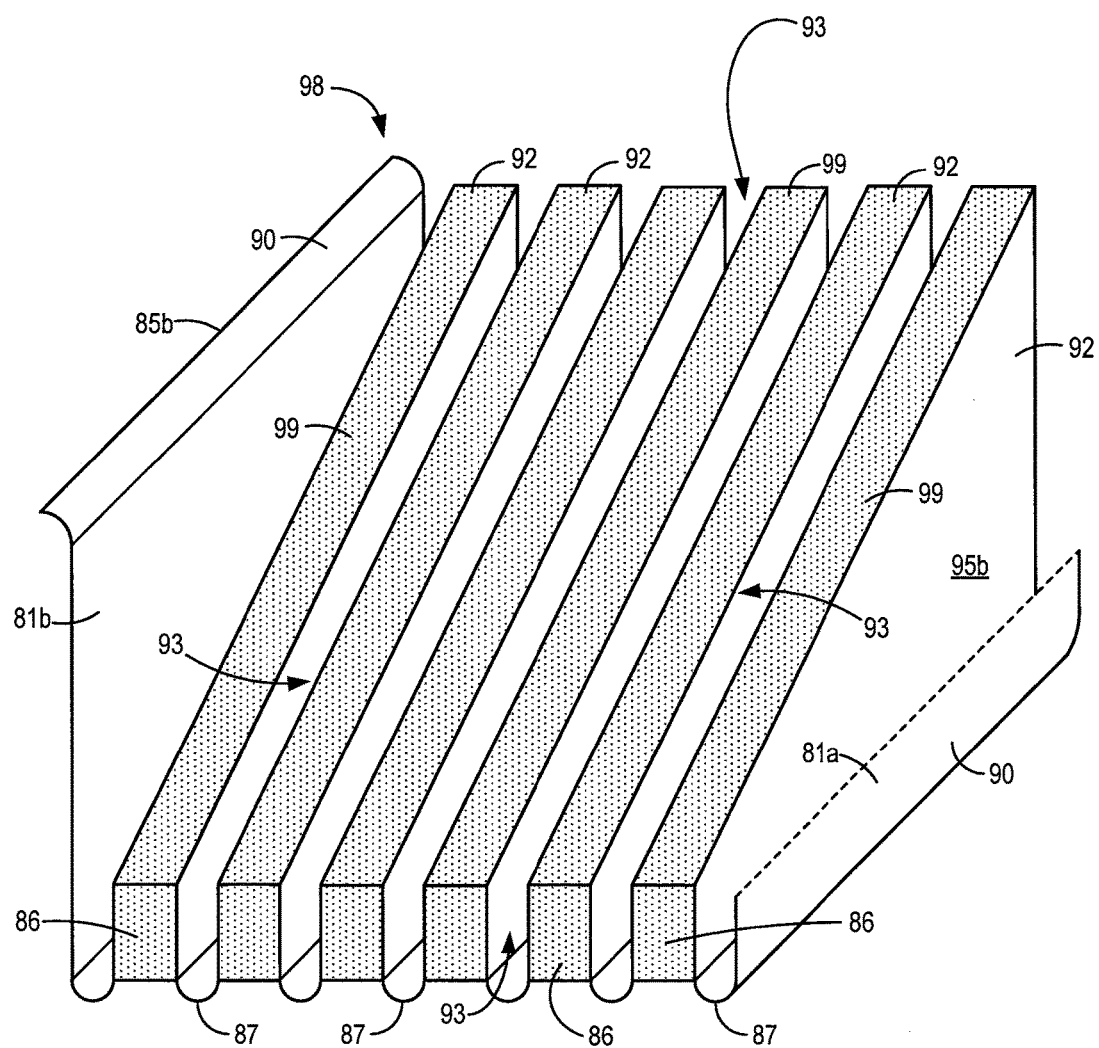
FIG. 10B is a perspective view schematic diagram of the pleated membrane sheet shown in FIG. 9A, viewed from the outlet end, in which the two inlet edges of each pleat (not shown) are bonded together, and the two outlet edges of each pleat are also bonded together, thereby forming a plurality of membrane leaves, each leaf comprising one bonded inlet edge (not shown) and one bonded outlet edge, and in which the distal edges of the leaves are bonded and tapered, thereby forming a plurality of tapered membrane leaves.
Figure 11A:
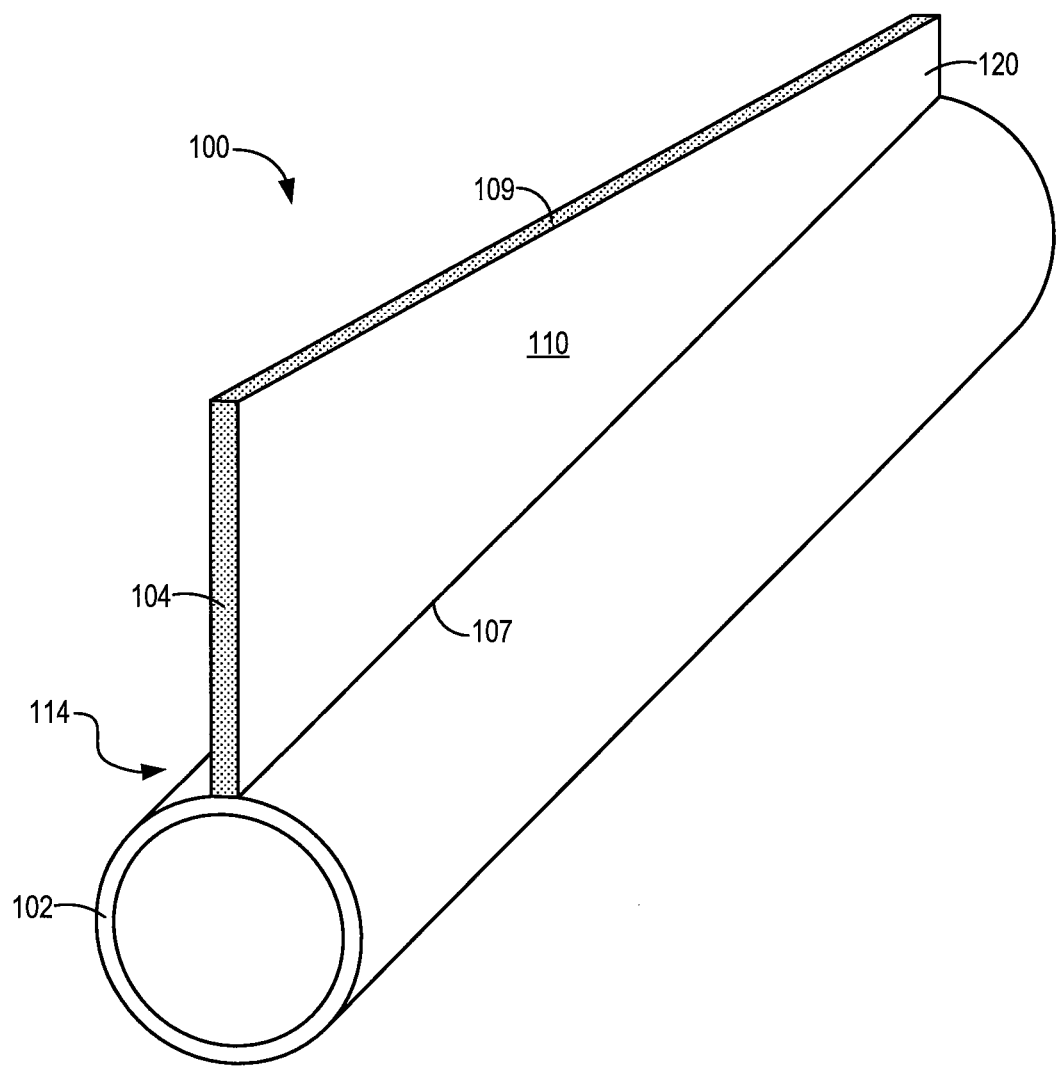
FIG. 11A is a perspective view schematic diagram of one tapered membrane leaf attached to a permeate tube in a pleated (multiple-leaf), tapered, and spiral-wound cross-flow filter element, viewed from the inlet end.
Figure 11B:
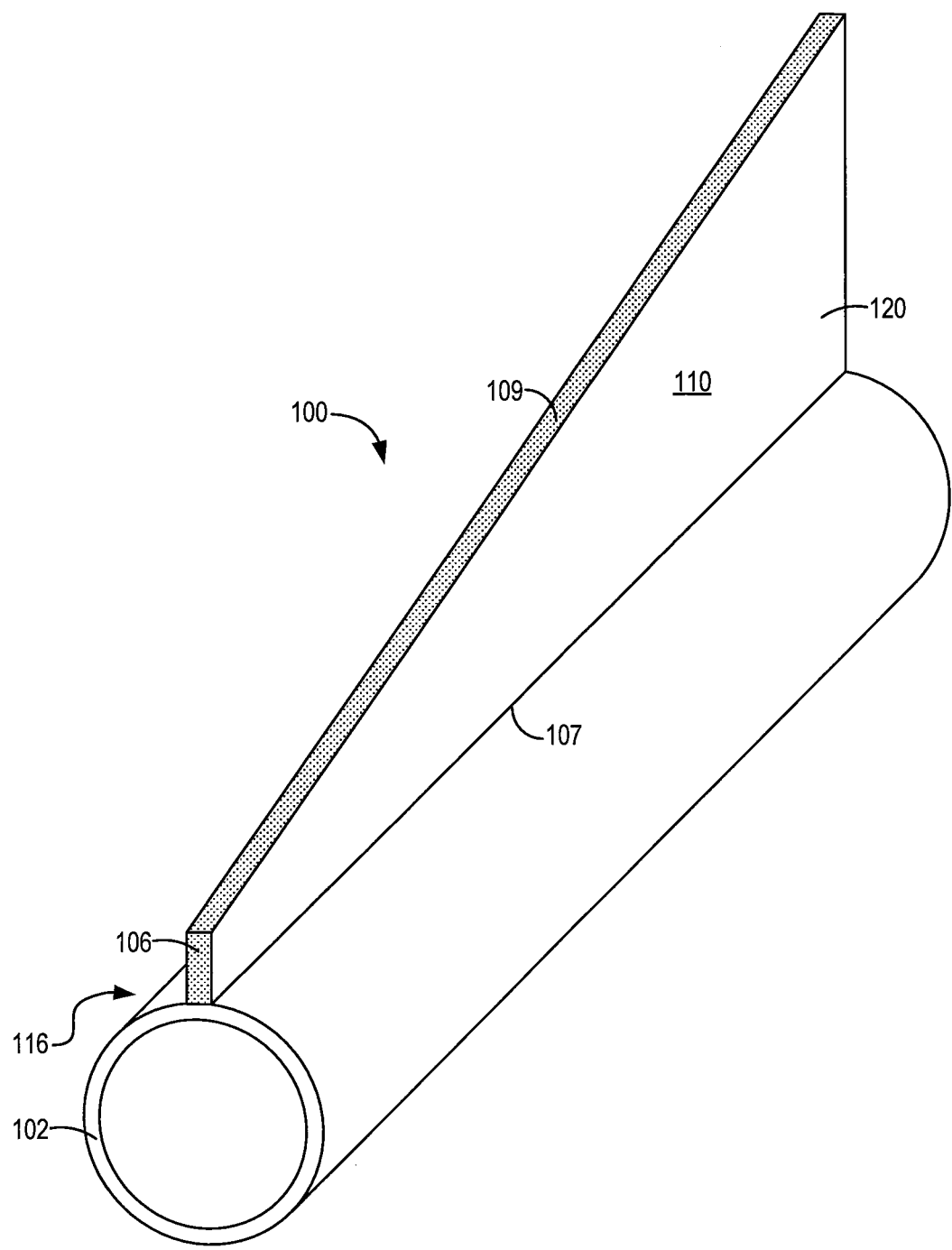
FIG. 11B is a perspective view schematic diagram of one tapered membrane leaf attached to a permeate tube in a pleated (multiple-leaf), tapered, and spiral-wound cross-flow filter element, viewed from the outlet end.

Referring to FIGS. 10A and 10B, a pleated and tapered filtration membrane 90 forms a pleat pack 98 comprising a plurality of leaves 92 and two half-leaves (81a, 81b). Each leaf 92 comprises two plies (95a, 95b) of the pleated filtration membrane 90 connected by a tapered and bonded (e.g., glued, welded, or otherwise sealed) distal edge 99.

Referring to FIGS. 8, 9A, and 9B, bonded and tapered distal edges 99 can be formed, for example, by making diagonal welds across leaves 82, each leaf comprising a bonded inlet edge 84, a the bonded outlet edge 86, a folded distal edge 89, and a proximal end opposite the distal edge 89, the proximal end comprising two folded proximal edges 87. Alternatively, the bonded and tapered distal edges 99 can be formed, for example, by making diagonal cuts across leaves 82 and gluing or otherwise adhesively bonding the two constituent plies together along the cut edges.

Referring again to FIGS. 10A and 10B, the bonded and tapered (e.g., welded and tapered, or tapered and adhesively bonded) distal edge 99 extends between the bonded inlet edge 84 and the bonded outlet edge 86 (e.g., the welded inlet edge 84 and the welded outlet edge 86). Thus, each leaf 92 comprises a hollow internal space defined by the two constituent plies of the pleated filtration membrane 90, the bonded and tapered distal edge 89, the bonded inlet edge 84, and the bonded outlet edge 86. The length of the bonded inlet edge 84 is greater than the length of the bonded outlet edge 86.

As described above, a permeate spacer may be located within the hollow internal space of each leaf 92. Referring to FIGS. 8, 9A, and 9B, in some examples, permeate spacers can be positioned within each leaf 84 before making diagonal welds or otherwise diagonally cutting and sealing the distal edge of each leaf. In such examples, the welding or other sealing process can form bonds between the two filtration membrane plies and the permeate spacer material sandwiched between the two filtration membrane plies along the tapered distal edge 99. Similarly, welding or otherwise sealing the inlet edge 84 and the outlet edge 86 can form bonds between the two filtration membrane plies and the permeate spacer material sandwiched between the two filtration membrane plies along the edges. Referring again to FIGS. 10A and 10B, each leaf 92 is separated from and connected to immediately adjacent leaves 92 by the two folded proximal edges 87. As described above, a feed spacer may be located between each leaf 92 in the inter-leaf spaces 93.

A pleated, tapered, and spiral-wound cross-flow filter element can be made by positioning a pleated and tapered filtration membrane (such as the pleated and tapered filtration membrane 90) around a permeate tube so that the plurality of leaves are circumferentially spaced around the permeate tube in the manner illustrated in FIGS. 4B and 5B. Referring to FIGS. 8-10B, when the pleated and tapered filtration membrane 90 is positioned around a permeate tube, the edges 85a, 85b of the two half-leaves 81a, 81b are aligned and welded or otherwise bonded together to form a final leaf comprising a bonded inlet edge 84, a the bonded outlet edge 86, a bonded and tapered distal edge 99, and a proximal end opposite the distal edge 99, the proximal end comprising two folded proximal edges 87. The pleated and tapered filtration membrane is then attached to the permeate tube, for example, by welding or otherwise bonding the pleated and tapered filtration membrane to the permeate tube at both the inlet end and the outlet end of the folded proximal edges between each leaf. The plurality of leaves are then spiral-would around the permeate tube in a uniform direction in the manner illustrated in FIGS. 4C and 5C.

Referring to FIGS. 11A-14B, a pleated, tapered, and spiral-wound cross-flow filter element 100 comprises a permeate tube 102 and a pleated filtration membrane 110 attached to the permeate tube 102. The pleated filtration membrane comprising a plurality of leaves 120 circumferentially spaced around the permeate tube 102 and spiral-wound around the permeate tube in a uniform direction (only one leaf 120 is shown in FIGS. 11A-13 for ease of illustration). Each leaf 120 comprises an inlet edge 104 (welded or otherwise bonded and sealed); an outlet edge 106 (welded or otherwise bonded and sealed), wherein the length of the inlet edge 104 is greater than the length of the outlet edge 106; a tapered distal edge 109 extending between the inlet edge 104 and the outlet edge 106 (welded or otherwise bonded and sealed); and a proximal end 107 located adjacent to the permeate tube (and comprising two folded proximal edges, not shown) extending between an inlet end 114 of the pleated filtration membrane 110 and an outlet end 116 of the pleated filtration membrane 110.

The pleated filtration membrane 110 is welded or otherwise attached or bonded to the permeate tube 102 at the inlet end 114 and/or the outlet end 116 of the folded proximal edges between each leaf (not shown). Although not shown, the pleated, tapered, and spiral-wound cross-flow filter element 100 can comprise permeate spacers located within each leaf 120, or feed spacers located between each leaf 120, or both.

Figure 12:
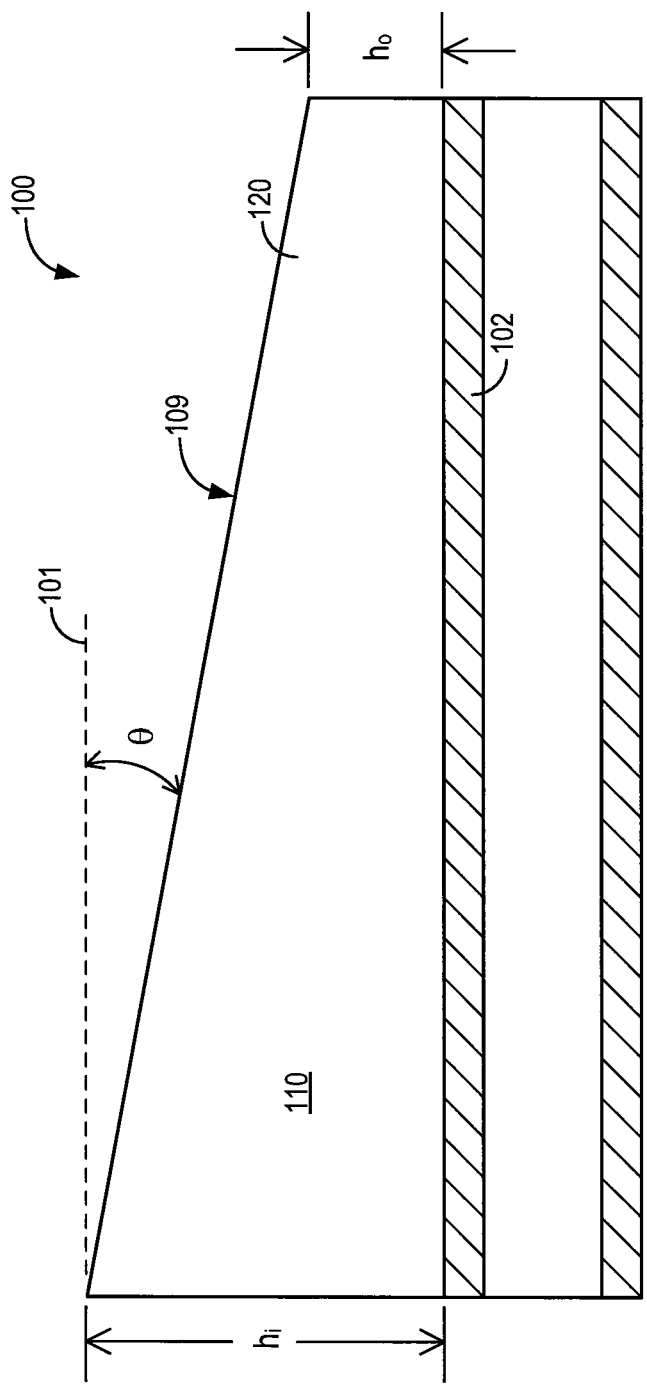
FIG. 12 is a side view cross-sectional schematic diagram of one tapered membrane leaf attached to a permeate tube in a pleated (multiple-leaf), tapered, and spiral-wound cross-flow filter element illustrating the difference between the inlet end leaf height ($h_i$) and the outlet end leaf height ($h_o$) provided by the taper angle ($\theta$)
Figure 13:
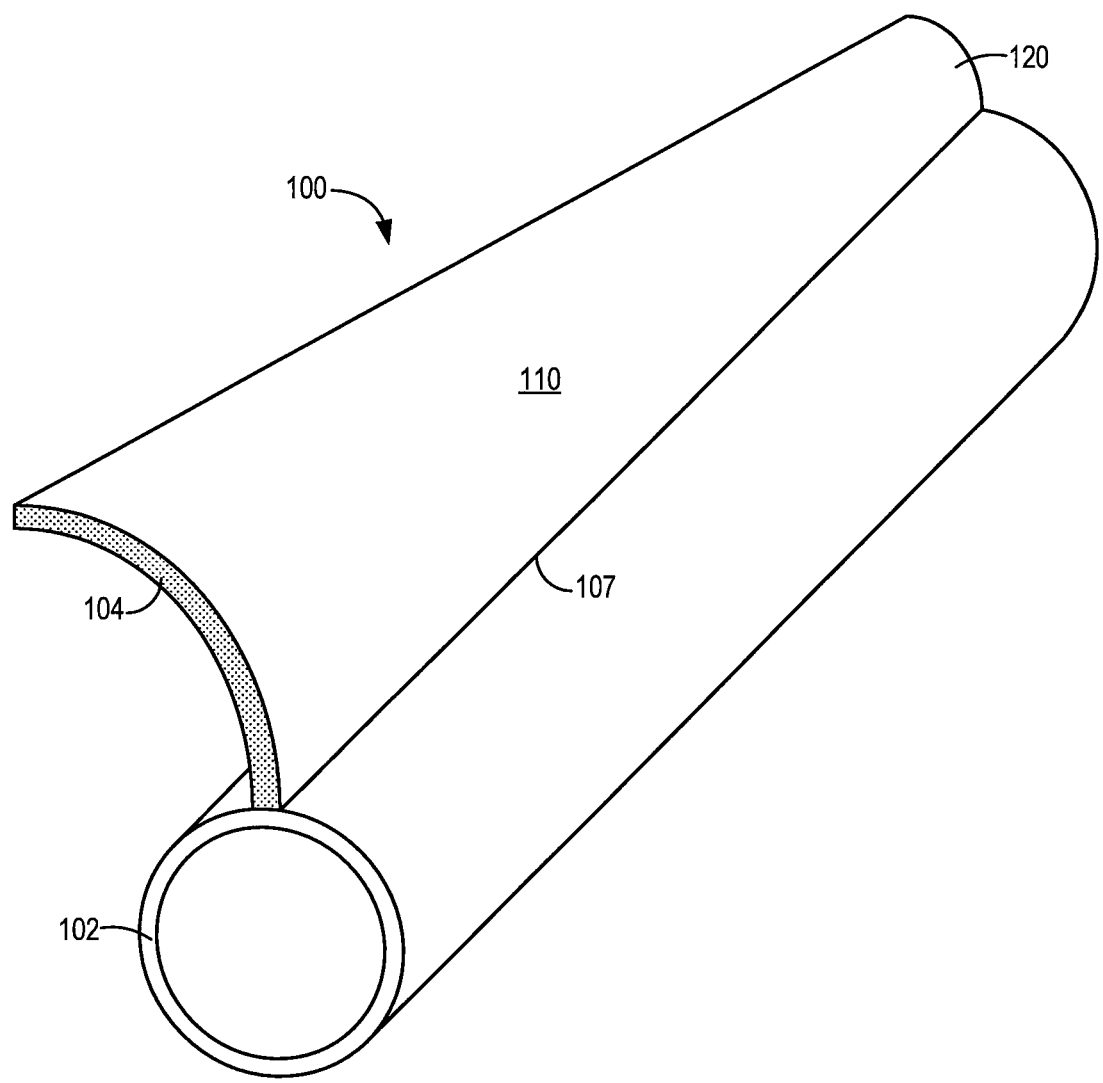
FIG. 13 is a perspective view schematic diagram of one tapered and spiral-wound membrane leaf attached to a permeate tube in a pleated (multiple-leaf), tapered, and spiral-wound cross-flow filter element, viewed from the inlet end.

Referring to FIG. 12, the tapered distal edge 109 forms a taper angle ($\theta$) relative to the longitudinal axis 101 of filter element 100 such that the length ($h_i$) of the inlet edge 104 is greater than the length ($1_0$ of the outlet edge 106. The taper angle ($\theta$) and the respective edge lengths ($h_i$ and $h_o$) can be determined for any particular implementation based on the targeted feed pressure, feed and retentate fluid velocity, and permeate flux rate (volumetric flow rate per unit area of filtration membrane). Given these parameters, the taper angle ($\theta$) and the respective edge lengths ($h_i$ and $h_o$) can be calculated to provide a pleated and tapered filtration membrane 110 that, when spiral-wound (see FIG. 13), provides a cross-flow filter element having a diameter that decreases from the inlet end to the outlet end (see FIG. 14A) and also having open area available for feed/retentate flow that decreases from the inlet end to the outlet end and controls the feed and retentate fluid velocity throughout the inlet-to-outlet length of the filter element. Generally speaking, lower permeate flux rates will require smaller taper angles ($\theta$), while higher permeate flux rates will require larger taper angles ($\theta$), to maintain feed and retentate fluid velocity.

Figure 14A:
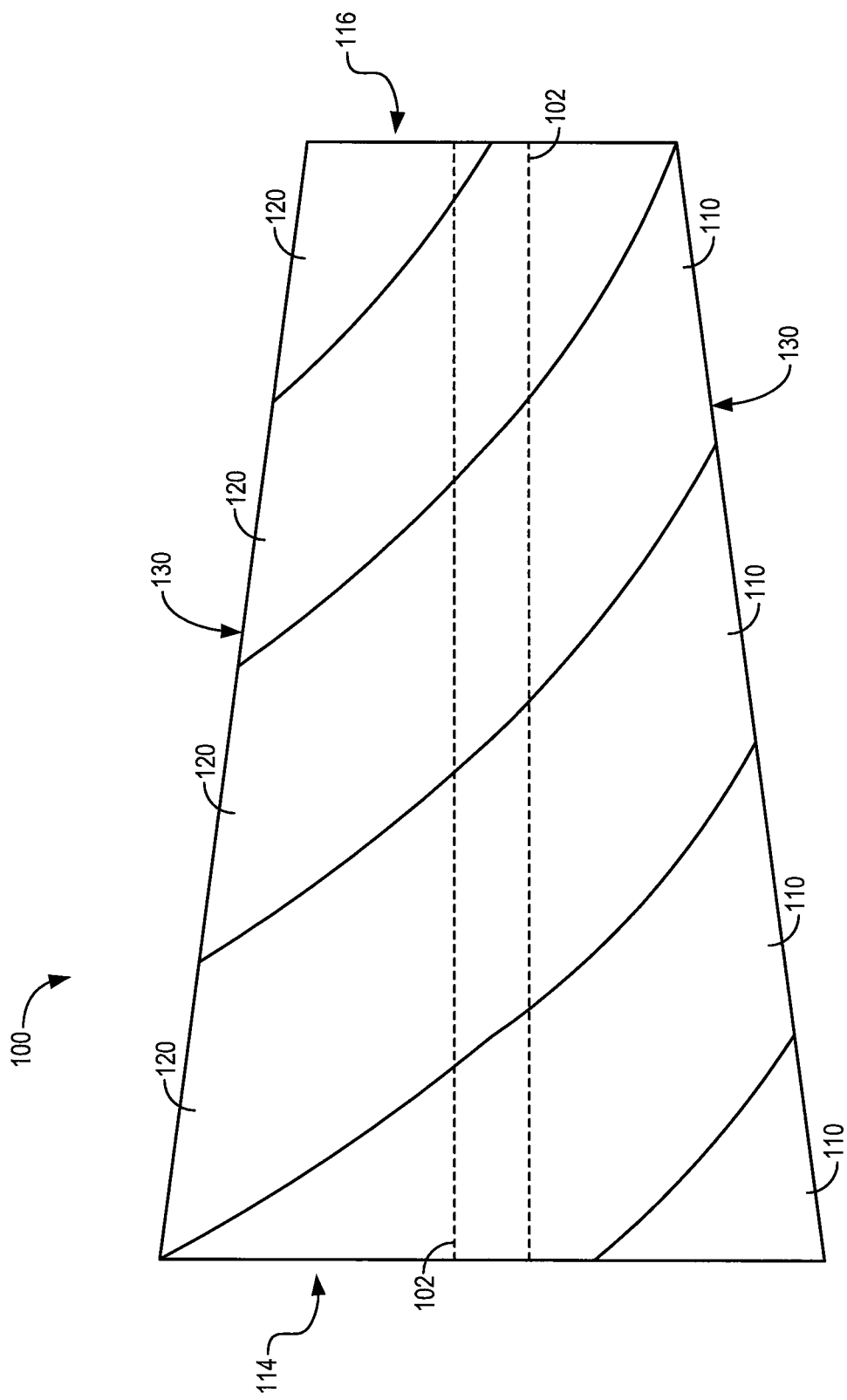
FIG. 14A is a side view schematic diagram of a pleated (multiple-leaf), tapered, and spiral-wound cross-flow filter element showing a plurality of pleated, tapered, and spiral-wound membrane leaves.
Figure 14B:
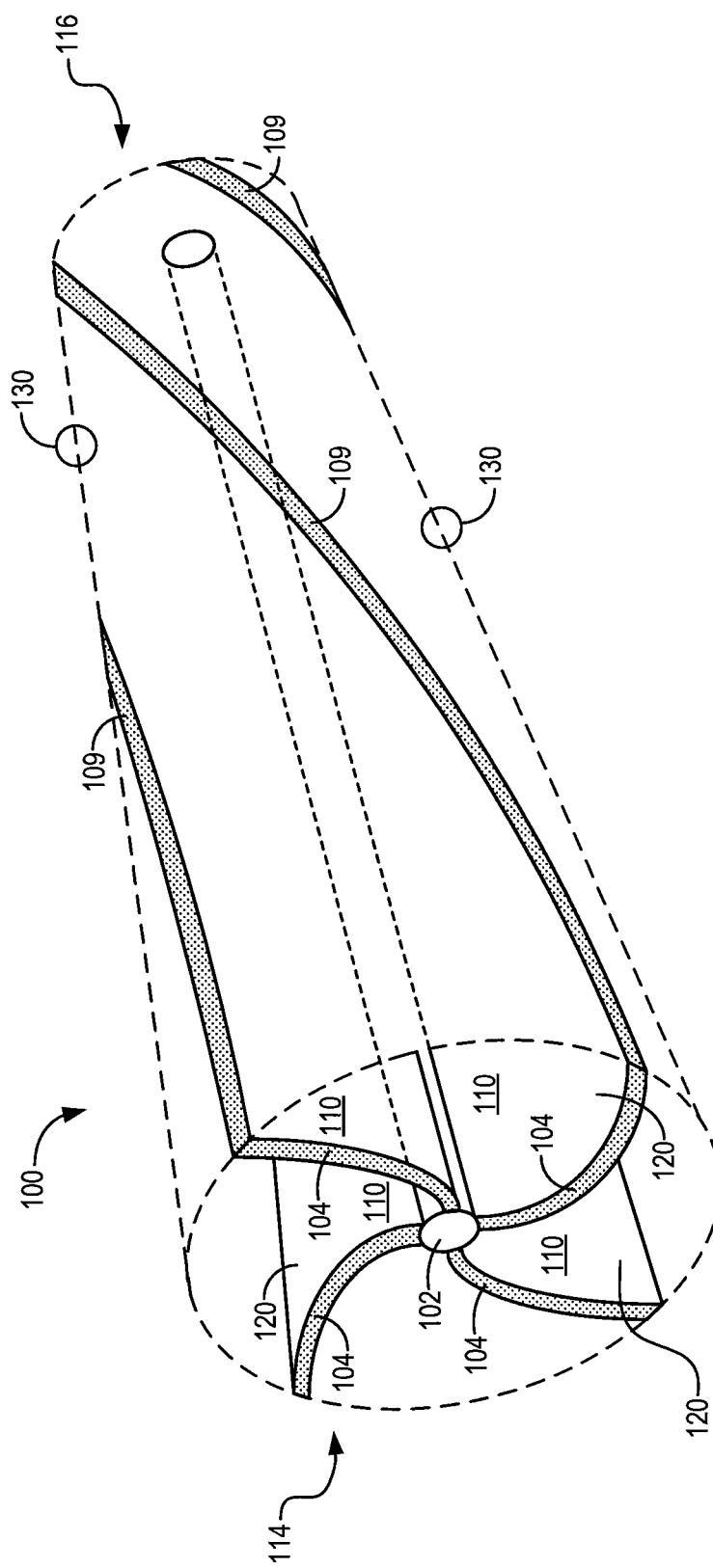
FIG. 14B is a perspective view schematic diagram of a pleated (multiple-leaf), tapered, and spiral-wound cross-flow filter element showing a plurality of pleated, tapered, and spiral-wound membrane leaves, viewed from the inlet end.

Referring to FIGS. 14A and 14B, in some examples, a pleated, tapered, and spiral-wound cross-flow filter element 100 may comprise an outer covering 130. The outer covering 130 may comprise a sheet of polymeric material, such as, the polymeric material described above (e.g., plastics, fiber-reinforced (e.g., fiberglass-reinforced) plastics and rovings, and the like). The outer covering 130 may comprise a tapered sheet that is welded, glued, or otherwise bonded or attached to one of the plurality of tapered leaves 120. The sheet is then wound around the plurality of leaves 120 in a uniform direction and welded or otherwise bonded or attached to itself, thereby enveloping the pleated, tapered, and spiral-wound filtration membrane 110 within the outer covering 130. In other examples, the outer covering 130 may comprise a pre-formed (e.g., cast, machined, or molded) sleeve or conical cylinder made, for example, of a polymeric (e.g., plastic), metal, alloy, ceramic, or composite material, and positioned around the pleated, tapered, and spiral-wound filtration membrane 110.

Figure 15A:
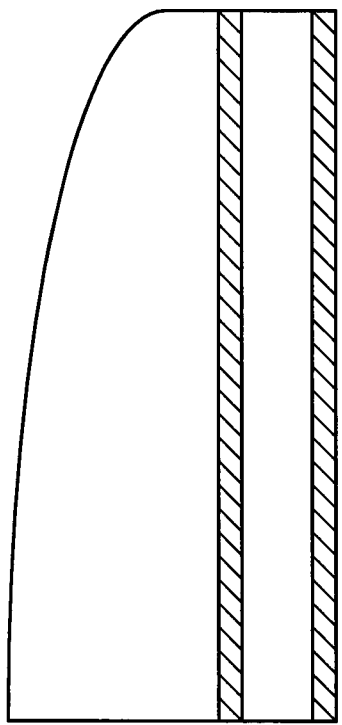
FIGS. 15A-15D are side view cross-sectional schematic diagrams of one tapered membrane leaf attached to a permeate tube in a pleated (multiple-leaf), tapered, and spiral-wound cross-flow filter element, each diagram illustrating a different taper profile.
Figure 15B:
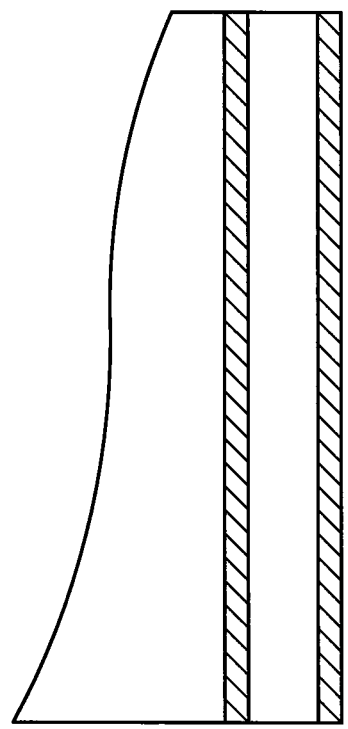
Figure 15C:
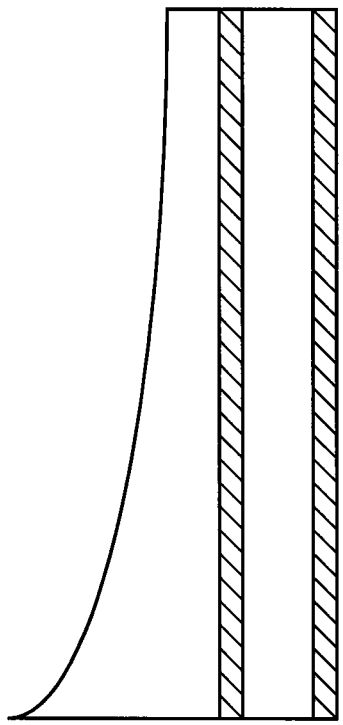
Figure 15D:
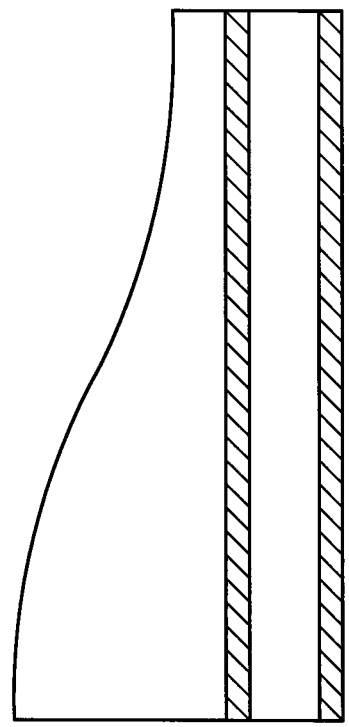

In the examples described above, the tapered distal edges of the plurality of leaves of the pleated filtration membrane (and thus the inlet-to-outlet cross-sectional contours of the spiral-wound filter element) comprise a continuous and linear taper profile extending between the inlet edges and the outlet edges of the leaves. It is understood, however, that the taper profile is not limited to a continuous and linear taper profile. For example, the taper profile of the plurality of leaves of the pleated filtration membrane may be exponentially-shaped (FIG. 15A), logarithmically-shaped (FIG. 15B), or comprise an inflecting shape (FIGS. 15C and 15D) defined by a spline function. Additionally, the taper profile of the plurality of leaves of the pleated filtration membrane may be discontinuous and comprise, for example, a stepped shape extending from the inlet edges to outlet edges of each leaf.

Figure 16:
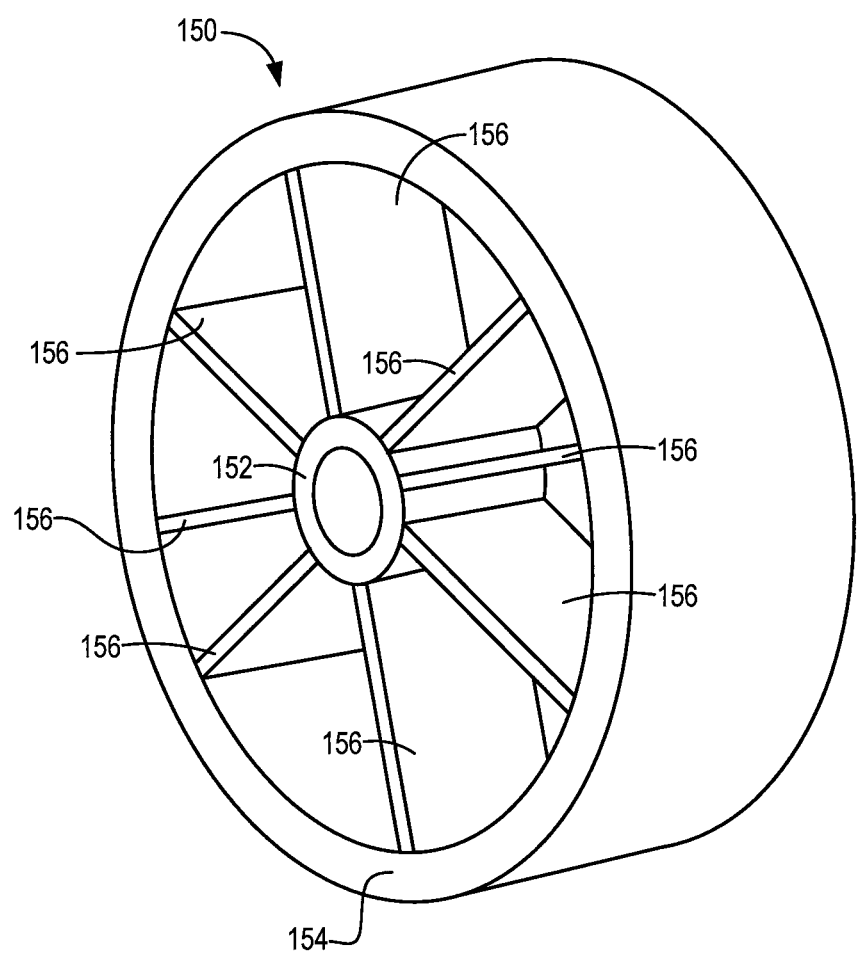
FIG. 16 is a perspective view schematic diagram of an anti-telescoping device.

In some examples, a pleated, tapered, and spiral-wound cross-flow filter element may comprise at least one anti-telescoping device. Referring to FIG. 16, an anti-telescoping device 150 comprises an inner ring 152, and outer ring 154, and radial struts 156 extending between the inner ring 152 and the outer ring 154. A spiral-wound cross-flow filter element may comprise a first anti-telescoping device welded or otherwise bonded or attached to an inlet end of a permeate tube, and a second anti-telescoping device welded or otherwise bonded or attached to the outlet end of the permeate tube. In some examples, the outer ring of the second anti-telescoping device has a larger radial dimension than the outer ring of the first anti-telescoping device. In some examples, the first anti-telescoping device has a larger diameter than the second anti-telescoping device.

Figure 17A:
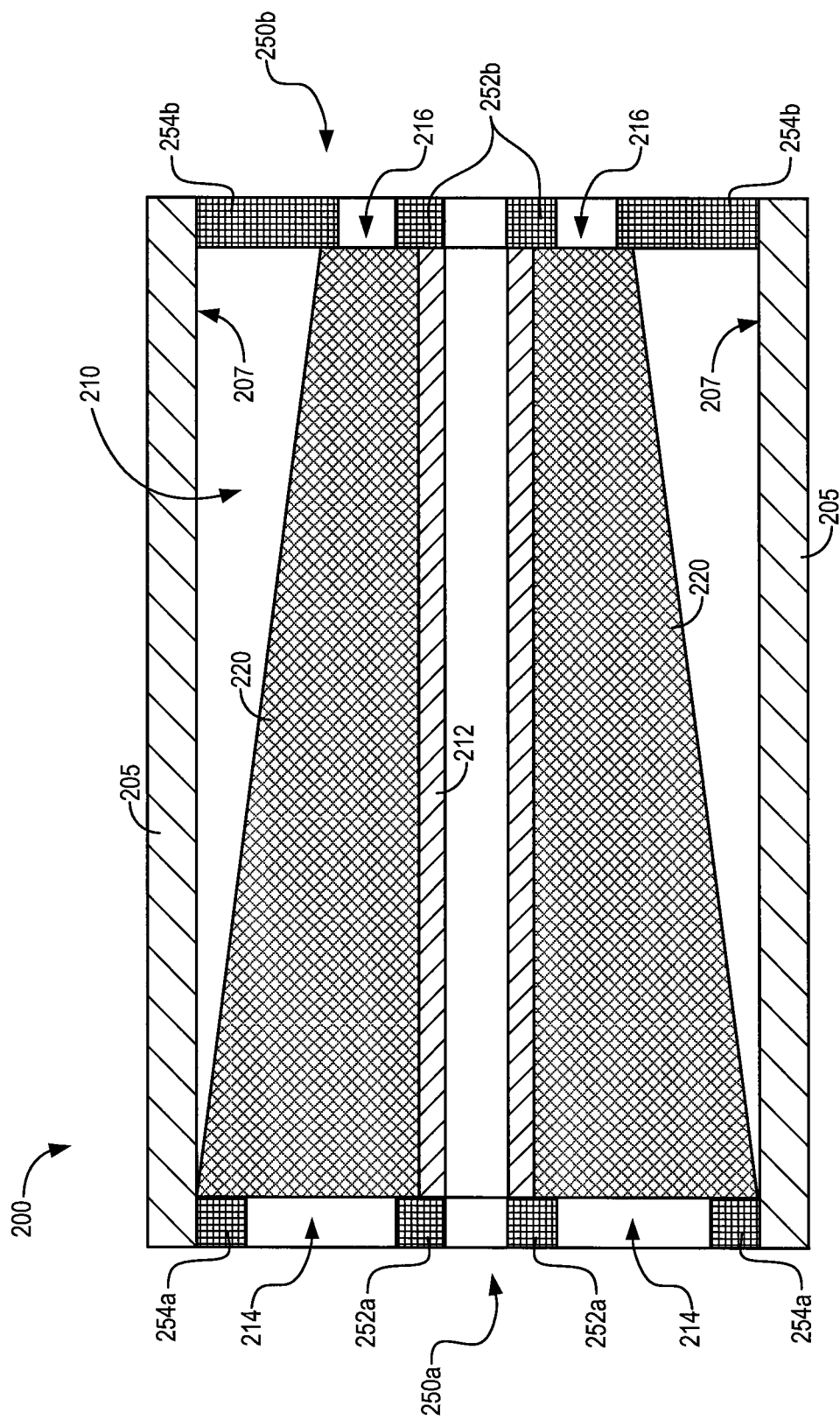
FIG. 17A is a side cross-sectional schematic diagram of a pleated (multiple-leaf), tapered, and spiral-wound cross-flow filter element positioned within a cylindrical filter housing between two anti-telescoping devices.

Referring to FIG. 17A, a cross-flow filter 200 comprises a housing 205 and a pleated, tapered, and spiral-wound cross-flow filter element 210. The spiral-wound cross-flow filter element 210 comprises a permeate tube 212 located within the housing 205, and a pleated and tapered filtration membrane 220 attached to the permeate tube 212 and located between the permeate tube 212 and the housing 205. The pleated filtration membrane 212 comprises a plurality of leaves circumferentially spaced around the permeate tube 212 and spiral-wound around the permeate tube 212 in a uniform direction. Each leaf of the plurality of leaves comprises an inlet edge, an outlet edge (wherein the length of the inlet edge is greater than the length of the outlet edge), a tapered distal edge extending between the inlet edge and the outlet edge, and a proximal end located adjacent to the permeate tube and comprising two folded proximal edges extending between an inlet end 214 of the pleated and tapered filtration membrane 220 and an outlet end 216 of the pleated and tapered filtration membrane 220.

Still referring to FIG. 17A, the spiral-wound cross-flow filter element 210 further comprises a first anti-telescoping device 250a welded or otherwise bonded or attached (e.g., glued, fastened, treaded, press-fit (with or without o-rings or other fluid sealing devices), and the like) to the inlet end of the permeate tube 212, and a second anti-telescoping device 250b welded or otherwise bonded or attached to the outlet end of the permeate tube 212. The outer ring 254b of the second anti-telescoping device 250b has a larger radial dimension than the outer ring 254a of the first anti-telescoping device 250a. The inner ring 252b of the second anti-telescoping device 250b has the same radial dimension as the inner ring 252a of the first anti-telescoping device 250a. The spiral-wound cross-flow filter element 210, including the first and second anti-telescoping devices 250a, 250b, is surrounded by the cylindrical-shaped inner surface 207 of the housing 205. The outer rings 254a, 254b of the first and second anti-telescoping devices 250a, 250b are welded or otherwise bonded, attached, and/or sealed to the cylindrical-shaped inner surface 207 of the housing 205. For example, the outer rings 254a, 254b of the first and second anti-telescoping devices 250a, 250b can be sealed to the housing 205 using a separate sealing ring or netted outer wrap (not shown).

Figure 17B:
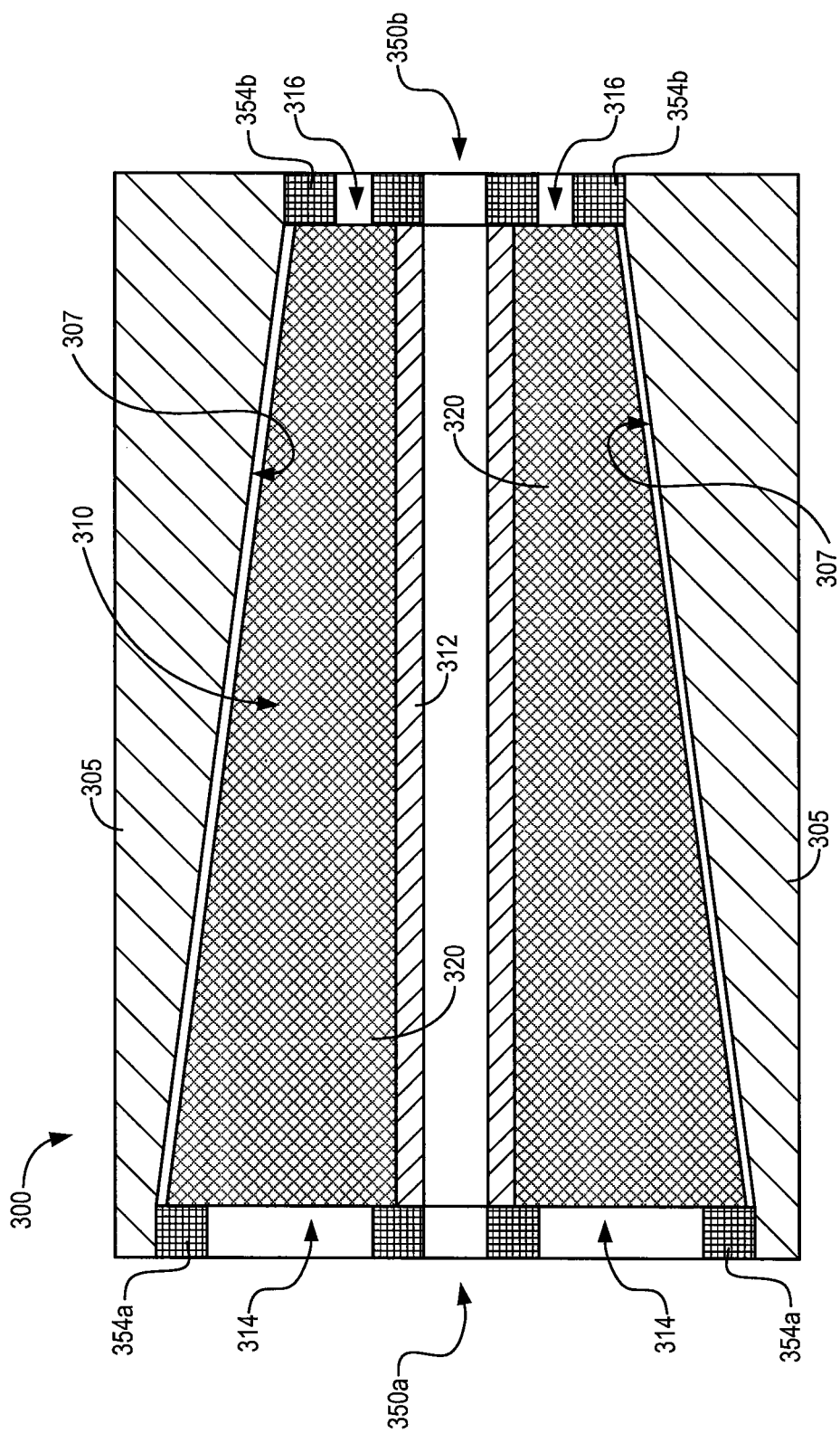
FIG. 17B is a side cross-sectional schematic diagram of a pleated (multiple-leaf), tapered, and spiral-wound cross-flow filter element positioned within a tapered filter housing between two anti-telescoping devices.

Referring to FIG. 17B, a cross-flow filter 300 comprises a housing 305 and a pleated, tapered, and spiral-wound cross-flow filter element 310. The spiral-wound cross-flow filter element 310 comprises a permeate tube 312 located within the housing 305, and a pleated and tapered filtration membrane 320 attached to the permeate tube 312 and located between the permeate tube 312 and the housing 305. The pleated filtration membrane 312 comprises a plurality of leaves circumferentially spaced around the permeate tube 312 and spiral-wound around the permeate tube 312 in a uniform direction. Each leaf of the plurality of leaves comprises an inlet edge, an outlet edge (wherein the length of the inlet edge is greater than the length of the outlet edge), a tapered distal edge extending between the inlet edge and the outlet edge, and a proximal end located adjacent to the permeate tube and comprising two folded proximal edges extending between an inlet end 314 of the pleated and tapered filtration membrane 320 and an outlet end 316 of the pleated and tapered filtration membrane 320.

Still referring to FIG. 17B, the spiral-wound cross-flow filter element 310 further comprises a first anti-telescoping device 350a welded or otherwise bonded or attached to the inlet end of the permeate tube 312, and a second anti-telescoping device 250b welded or otherwise bonded or attached (e.g., glued, fastened, treaded, press-fit (with or without o-rings or other fluid sealing devices), and the like) to the outlet end of the permeate tube 312. The first anti-telescoping device 350a has a larger diameter than the second anti-telescoping device 350b. The spiral-wound cross-flow filter element 310 is surrounded by the cylindrical-shaped inner surface 307 of the housing 305. The outer rings 354a, 354b of the first and second anti-telescoping devices 350a, 350b are welded or otherwise bonded, attached, or sealed to the housing 205. For example, the outer rings 354a, 354b of the first and second anti-telescoping devices 350a, 350b can be sealed to the housing 305 using a separate sealing ring or netted outer wrap (not shown).

As described above, a pleated, tapered, and spiral-wound cross-flow filter element provides decreasing area for feed and retentate flow between each leaf, which controls fluid velocity along the length of the filter element. This control over the fluid velocity along the length of the filter element may be used to maintain or otherwise control the effectiveness of membrane cleaning and fouling prevention while simultaneously maintaining or otherwise controlling permeate flux capacity. Additionally, as described above, the tapered distal edge of each leaf simultaneously allows the leaf-to-leaf distance to be maintained, for example, by a feed spacer having an appropriate width depending on the solids content of the fluid to be filtered and the desired recovery rate, which preserves the ability to flow retentate fluid comprising concentrated solids content through the filter element without occlusion or blockage.

An additional advantage of a pleated, tapered, and spiral-wound cross-flow filter element is the increase in transmembrane pressure (TMP) and corresponding increase in permeate flux rate. During operation of a non-tapered filter element, as feed fluid flows tangential to the filtration membrane and a portion passes through the filtration membrane, the fluid pressure on the feed/retentate side of the filtration membrane decreases along its inlet-to-outlet length. As a result, the pressure differential across the filtration membrane decreases along the inlet-to-outlet length of a non-tapered filter element, which decreases the TMP (defined as the average pressure on the feed/retentate side minus the permeate pressure) and permeate flux rate. The flow restriction provided by the decreasing area for feed/retentate flow between each leaf in the pleated, tapered, and spiral-wound cross-flow filter elements described in this specification simultaneously maintains fluid velocity and pressure difference along the length of the filter element from the feed end to the retentate end of the filtration membrane. As a result, the TMP is increased compared to otherwise equivalent non-tapered filter elements, which causes increased permeate flux.

The present invention includes the pleated, tapered, and spiral-wound cross-flow filter elements described above and cross-flow filters comprising the filter elements. The present invention also includes filtration processes comprising flowing fluid through cross-flow filters comprising pleated, tapered, and spiral-wound cross-flow filter elements. The present invention also includes filtration systems comprising at least one cross-flow filter comprising a pleated, tapered, and spiral-wound cross-flow filter element.

ASPECTS OF THE INVENTION

Aspects of the invention include, but are not limited to, the following numbered clauses.

1. A spiral-wound cross-flow filter element comprising:
   a permeate tube; and
   a pleated filtration membrane welded to the permeate tube, the pleated filtration membrane comprising a plurality of leaves circumferentially spaced around the permeate tube and spiral-wound around the permeate tube in a uniform direction;
   wherein each leaf comprises:
   a welded inlet edge;
   a welded outlet edge, wherein the length of the welded inlet edge is greater than the length of the welded outlet edge;
   a welded and tapered distal edge extending between the welded inlet edge and the welded outlet edge; and
   a proximal end located adjacent to the permeate tube and comprising two folded proximal edges extending between an inlet end of the pleated filtration membrane and an outlet end of the pleated filtration membrane.

2. The spiral-wound cross-flow filter element of clause 1, wherein the welded and tapered distal edge comprises a continuous taper profile extending between the welded inlet edge and the welded outlet edge.

3. The spiral-wound cross-flow filter element of clause 2, wherein the welded and tapered distal edge comprises a linear taper profile extending between the welded inlet edge and the welded outlet edge.

4. The spiral-wound cross-flow filter element of any one of clauses 1-3, wherein the welded inlet edge, the welded outlet edge, and the welded and tapered distal edge of each leaf comprise ultrasonic welds, thermal welds, infrared welds, radio frequency welds, microwave welds, laser welds, or hot air welds.

5. The spiral-wound cross-flow filter element of any one of clauses 1-4, wherein the pleated filtration membrane is welded to the permeate tube at the inlet end and/or the outlet end of the folded proximal edges between each leaf.

6. The spiral-wound cross-flow filter element of any one of clauses 1-5, wherein the welds between the pleated filtration membrane and the permeate tube comprise ultrasonic welds, thermal welds, infrared welds, radio frequency welds, microwave welds, laser welds, or hot air welds.

7. The spiral-wound cross-flow filter element of any one of clauses 1-6, further comprising either:
   (i) a tapered plastic sheet attached to one of the plurality of tapered leaves, wherein the plastic sheet is wound around the plurality of leaves in the uniform direction and attached or cured to itself, thereby enveloping the pleated, tapered, and spiral-wound filtration membrane;
   (ii) a tapered fiberglass-reinforced roving attached to one of the plurality of tapered leaves, wherein the fiberglass-reinforced roving is wound around the plurality of leaves in the uniform direction and attached or cured to itself, thereby enveloping the pleated, tapered, and spiral-wound filtration membrane; or
   (iii) a pre-formed sleeve or conical cylinder positioned around the pleated, tapered, and spiral-wound filtration membrane.

8. The spiral-wound cross-flow filter element of clause 7, wherein the tapered plastic sheet or the tapered fiberglass-reinforced roving is welded to one of the plurality of tapered leaves, wound around the plurality of leaves in the uniform direction, and welded or cured to itself.

9. The spiral-wound cross-flow filter element of any one of clauses 1-8, further comprising permeate spacers located within each leaf.

10. The spiral-wound cross-flow filter element of any one of clauses 1-9, further comprising feed spacers located between each leaf.

11. The spiral-wound cross-flow filter element of any one of clauses 1-10, further comprising:
   a first anti-telescoping device attached to an inlet end of the permeate tube; and
   a second anti-telescoping device attached to an outlet end of the permeate tube;
   wherein the first anti-telescoping device and the second anti-telescoping device comprise an inner ring, an outer ring, and radial struts extending between the inner ring and the outer ring.

12. The spiral-wound cross-flow filter element of clause 11, wherein the first anti-telescoping device is welded to an inlet end of the permeate tube, and wherein the second anti-telescoping device is welded to an outlet end of the permeate tube.

13. The spiral-wound cross-flow filter element of clause 11 or clause 12, wherein the outer ring of the second anti-telescoping device has a larger radial dimension than the outer ring of the first anti-telescoping device.

14. The spiral-wound cross-flow filter element of clause 11 or clause 12, wherein the first anti-telescoping device has a larger diameter than the second anti-telescoping device.

15. A cross-flow filter comprising the spiral-wound cross-flow filter element of any one of clauses 1-14.

16. A filtration process comprising flowing a fluid through the cross-flow filter of clause 15.

17. A filtration system comprising at least one cross-flow filter of clause 15.

18. A spiral-wound cross-flow filter element comprising:
   a permeate tube; and
   a pleated filtration membrane attached to the permeate tube, the pleated filtration membrane comprising a plurality of leaves circumferentially spaced around the permeate tube and spiral-wound around the permeate tube in a uniform direction;
   wherein each leaf comprises:
      an inlet edge;
      an outlet edge, wherein the length of the inlet edge is greater than the length of the outlet edge;
      a tapered distal edge extending between the inlet edge and the outlet edge; and
      a proximal end located adjacent to the permeate tube and comprising two folded proximal edges extending between an inlet end of the pleated filtration membrane and an outlet end of the pleated filtration membrane.

19. The spiral-wound cross-flow filter element of clause 18, wherein the tapered distal edge comprises a linear taper profile extending between the inlet edge and the outlet edge.

20. The spiral-wound cross-flow filter element of clause 18 or clause 19, wherein each leaf comprises:
   a bond along at least a portion of the inlet edge;
   a bond along at least a portion of an outlet edge; and
   a bond along the entire length of the tapered distal edge;
   wherein the bonds seal together adjacent plies of the pleated filtration membrane and provide each leaf with a fluid impervious seal at the inlet edge, the outlet edge, and the tapered distal edge.

21. The spiral-wound cross-flow filter element of clause 20, wherein the bonds do not comprise an adhesive.

22. The spiral-wound cross-flow filter element of clause 21, wherein the bonds comprise ultrasonic welds, thermal welds, infrared welds, radio frequency welds, microwave welds, laser welds, or hot air welds.

23. The spiral-wound cross-flow filter element of any one of clauses 18-22, wherein the pleated filtration membrane is attached to the permeate tube at the inlet end and/or the outlet end of the folded proximal edges between each leaf.

24. The spiral-wound cross-flow filter element of clause 23, wherein the attachments comprise ultrasonic welds, thermal welds, infrared welds, radio frequency welds, microwave welds, laser welds, or hot air welds.

25. The spiral-wound cross-flow filter element of any one of clauses 18-24, further comprising either:
   (i) a tapered plastic sheet attached to one of the plurality of tapered leaves, wherein the plastic sheet is wound around the plurality of leaves in the uniform direction and attached or cured to itself, thereby enveloping the pleated, tapered, and spiral-wound filtration membrane;
   (ii) a tapered fiberglass-reinforced roving attached to one of the plurality of tapered leaves, wherein the fiberglass-reinforced roving is wound around the plurality of leaves in the uniform direction and attached or cured to itself, thereby enveloping the pleated, tapered, and spiral-wound filtration membrane; or
   (iii) a pre-formed sleeve or conical cylinder positioned around the pleated, tapered, and spiral-wound filtration membrane.

26. The spiral-wound cross-flow filter element of clause 25, wherein the tapered plastic sheet or the tapered fiberglass-reinforced roving is welded to one of the plurality of tapered leaves, wound around the plurality of leaves in the uniform direction, and welded or cured to itself.

27. The spiral-wound cross-flow filter element of any one of clauses 18-26, further comprising permeate spacers located within each leaf.

28. The spiral-wound cross-flow filter element of any one of clauses 18-27, further comprising feed spacers located between each leaf.

29. The spiral-wound cross-flow filter element of any one of clauses 18-28, further comprising:
   a first anti-telescoping device attached to an inlet end of the permeate tube; and
   a second anti-telescoping device attached to an outlet end of the permeate tube;

wherein the first anti-telescoping device and the second anti-telescoping device comprise an inner ring, an outer ring, and radial struts extending between the inner ring and the outer ring.

30. The spiral-wound cross-flow filter element of clause 29, wherein the outer ring of the second anti-telescoping device has a larger radial dimension than the outer ring of the first anti-telescoping device.

31. The spiral-wound cross-flow filter element of clause 29, wherein the first anti-telescoping device has a larger diameter than the second anti-telescoping device.

32. A cross-flow filter comprising the spiral-wound cross-flow filter element of any one of clauses 18-31.

33. A filtration process comprising flowing a fluid through the cross-flow filter of clause 32.

34. A filtration system comprising at least one cross-flow filter of clause 32.

35. A cross-flow filter comprising:
   a housing;
   a permeate tube located within the housing; and
   a pleated filtration membrane attached to the permeate tube and located between the permeate tube and the housing, the pleated filtration membrane comprising a plurality of leaves circumferentially spaced around the permeate tube and spiral-wound around the permeate tube in a uniform direction;
      wherein each leaf comprises:
      an inlet edge;
      an outlet edge, wherein the length of the inlet edge is greater than the length of the outlet edge;
      a tapered distal edge extending between the inlet edge and the outlet edge; and
      a proximal end located adjacent to the permeate tube and comprising two folded proximal edges extending between an inlet end of the pleated filtration membrane and an outlet end of the pleated filtration membrane.

36. The cross-flow filter of clause 15, clause 32, or clause 35, wherein the housing comprises a cylindrical-shaped inner surface surrounding the permeate tube and the pleated, tapered, and spiral-wound filtration membrane.

37. The cross-flow filter of clause 15, clause 32, or clause 35, wherein the housing comprises a conical-shaped inner surface surrounding the permeate tube and the pleated, tapered, and spiral-wound filtration membrane.

Various features and characteristics are described in this specification to provide an understanding of the structure, function, and operation of the invention, which includes the disclosed filter elements, filters, systems, and processes. It is understood that the various features and characteristics of the invention described in this specification can be combined in any suitable manner, regardless of whether such features and characteristics are expressly described in combination in this specification. The Inventors and the Applicant expressly intend such combinations of features and characteristics to be included within the scope of the invention described in this specification. As such, the claims can be amended to recite, in any combination, any features and characteristics expressly or inherently described in, or otherwise expressly or inherently supported by, this specification. Furthermore, the Applicant reserves the right to amend the claims to affirmatively disclaim features and characteristics that may be present in the prior art, even if those features and characteristics are not expressly described in this specification. Therefore, any such amendments will not add new matter to the specification or claims, and will comply with written description, sufficiency of description, and added matter requirements, including the requirements under 35 U.S.C. § 112(a) and Article 123(2) EPC.

Any numerical range recited in this specification describes all sub-ranges of the same numerical precision (i.e., having the same number of specified digits) subsumed within the recited range. For example, a recited range of "1.0 to 10.0" describes all sub-ranges between (and including) the recited minimum value of 1.0 and the recited maximum value of 10.0, such as, for example, "2.4 to 7.6," even if the range of "2.4 to 7.6" is not expressly recited in the text of the specification. Accordingly, the Applicant reserves the right to amend this specification, including the claims, to expressly recite any sub-range of the same numerical precision subsumed within the ranges expressly recited in this specification. All such ranges are inherently described in this specification such that amending to expressly recite any such sub-ranges will comply with written description, sufficiency of description, and added matter requirements, including the requirements under 35 U.S.C. § 112(a) and Article 123(2) EPC. Also, unless expressly specified or otherwise required by context, all numerical parameters described in this specification (such as those expressing values, ranges, amounts, percentages, and the like) may be read as if prefaced by the word "about," even if the word "about" does not expressly appear before a number. Additionally, numerical parameters described in this specification should be construed in light of the number of reported significant digits, numerical precision, and by applying ordinary rounding techniques. It is also understood that numerical parameters described in this specification will necessarily possess the inherent variability characteristic of the underlying measurement techniques used to determine the numerical value of the parameter.

The invention(s) described in this specification can comprise, consist of, or consist essentially of the various features and characteristics described in this specification. The terms "comprise" (and any form of comprise, such as "comprises" and "comprising"), "have" (and any form of have, such as "has" and "having"), "include" (and any form of include, such as "includes" and "including"), and "contain" (and any form of contain, such as "contains" and "containing") are open-ended linking verbs. Thus, a filter element that "comprises," "has," "includes," or "contains" one or more features and/or characteristics possesses those one or more features and/or characteristics, but is not limited to possessing only those one or more features and/or characteristics. Likewise, a component of a filter element that "comprises," "has," "includes," or "contains" one or more features and/or characteristics possesses those one or more features and/or characteristics, but is not limited to possessing only those one or more features and/or characteristics, and may possess additional features and/or characteristics.

The grammatical articles "a," "an," and "the," as used in this specification, including the claims, are intended to include "at least one" or "one or more", unless otherwise indicated. Thus, the articles are used in this specification to refer to one or more than one (i.e., to "at least one") of the grammatical objects of the article. By way of example, "a component" means one or more components, and thus, possibly, more than one component is contemplated and can be employed or used in an implementation of the described compositions, coatings, and processes. Nevertheless, it is understood that use of the terms "at least one" or "one or more" in some instances, but not others, will not result in any interpretation where failure to use the terms limits objects of the grammatical articles "a," "an," and "the" to just one. Further, the use of a singular noun includes the plural, and the use of a plural noun includes the singular, unless the context of the usage requires otherwise.

Any patent, publication, or other document identified in this specification is incorporated by reference into this specification in its entirety unless otherwise indicated, but only to the extent that the incorporated material does not conflict with existing descriptions, definitions, statements, illustrations, or other disclosure material expressly set forth in this specification. As such, and to the extent necessary, the express disclosure as set forth in this specification supersedes any conflicting material incorporated by reference. Any material, or portion thereof, that is incorporated by reference into this specification, but which conflicts with existing definitions, statements, or other disclosure material set forth herein, is only incorporated to the extent that no conflict arises between that incorporated material and the existing disclosure material. Applicant reserves the right to amend this specification to expressly recite any subject matter, or portion thereof, incorporated by reference. The amendment of this specification to add such incorporated subject matter will comply with written description, sufficiency of description, and added matter requirements, including the requirements under 35 U.S.C. § 112(a) and Article 123(2) EPC.

What is claimed is:

1. A spiral-wound cross-flow filter element comprising:
    a permeate tube; and
    a pleated filtration membrane welded to the permeate tube, the pleated filtration membrane comprising a plurality of leaves circumferentially spaced around the permeate tube and spiral-wound around the permeate tube in a uniform direction;
    wherein each leaf comprises:
        a welded inlet edge;
        a welded outlet edge, wherein the length of the welded inlet edge is greater than the length of the welded outlet edge;
        a welded and tapered distal edge extending between the welded inlet edge and the welded outlet edge; and
        a proximal end located adjacent to the permeate tube and comprising two folded proximal edges extending between an inlet end of the pleated filtration membrane and an outlet end of the pleated filtration membrane.

2. The spiral-wound cross-flow filter element of claim 1, wherein the welded and tapered distal edge comprises a continuous and linear taper profile extending between the welded inlet edge and the welded outlet edge.

3. The spiral-wound cross-flow filter element of claim 1, wherein the welded inlet edge, the welded outlet edge, and the welded and tapered distal edge of each leaf comprise ultrasonic welds, thermal welds, infrared welds, radio frequency welds, microwave welds, laser welds, or hot air welds.

4. The spiral-wound cross-flow filter element of claim 1, wherein the pleated filtration membrane is welded to the permeate tube at the inlet end and the outlet end of the folded proximal edges between each leaf.

5. The spiral-wound cross-flow filter element of claim 1, further comprising either:
    (i) a tapered plastic sheet welded to one of the plurality of tapered leaves, wherein the plastic sheet is wound around the plurality of leaves in the uniform direction and welded to itself, thereby enveloping the pleated, tapered, and spiral-wound filtration membrane
    (ii) a fiberglass-reinforced roving wound around the plurality of leaves in the uniform direction and attached or cured to itself, thereby enveloping the pleated, tapered, and spiral-wound filtration membrane; or
    (iii) a pre-formed sleeve or conical cylinder positioned around the pleated, tapered, and spiral-wound filtration membrane.

6. The spiral-wound cross-flow filter element of claim 1, further comprising permeate spacers located within each leaf.

7. The spiral-wound cross-flow filter element of claim 1, further comprising feed spacers located between each leaf.

8. The spiral-wound cross-flow filter element of claim 1, further comprising:
    a first anti-telescoping device attached to an inlet end of the permeate tube; and
    a second anti-telescoping device attached to an outlet end of the permeate tube;
    wherein the first anti-telescoping device and the second anti-telescoping device comprise an inner ring, an outer ring, and radial struts extending between the inner ring and the outer ring.

9. The spiral-wound cross-flow filter element of claim 8, wherein the first anti-telescoping device is welded to the inlet end of the permeate tube, and wherein the second anti-telescoping device is welded to the outlet end of the permeate tube.

10. The spiral-wound cross-flow filter element of claim 8, wherein the outer ring of the second anti-telescoping device has a larger radial dimension than the outer ring of the first anti-telescoping device.

11. The spiral-wound cross-flow filter element of claim 8, wherein the first anti-telescoping device has a larger diameter than the second anti-telescoping device.

12. A spiral-wound cross-flow filter element comprising:
    a permeate tube; and
    a pleated filtration membrane attached to the permeate tube, the pleated filtration membrane comprising a plurality of leaves circumferentially spaced around the permeate tube and spiral-wound around the permeate tube in a uniform direction;
    wherein each leaf comprises:
        an inlet edge;
        an outlet edge, wherein the length of the inlet edge is greater than the length of the outlet edge;
        a tapered distal edge extending between the inlet edge and the outlet edge; and
        a proximal end located adjacent to the permeate tube and comprising two folded proximal edges extending between an inlet end of the pleated filtration membrane and an outlet end of the pleated filtration membrane;
    wherein the pleated filtration membrane is attached to the permeate tube at the inlet end and the outlet end of the folded proximal edges between each leaf.

13. The spiral-wound cross-flow filter element of claim 12, wherein each leaf comprises:
    a bond along at least a portion of the inlet edge;
    a bond along at least a portion of an outlet edge; and
    a bond along the entire length of the tapered distal edge;
    wherein the bonds seal together adjacent plies of the pleated filtration membrane and provide each leaf with a fluid impervious seal at the inlet edge, the outlet edge, and the tapered distal edge.

14. The spiral-wound cross-flow filter element of claim 12, further comprising either:
    (i) a tapered plastic sheet attached to one of the plurality of tapered leaves, wherein the plastic sheet is wound around the plurality of leaves in the uniform direction and attached to itself, thereby enveloping the pleated, tapered, and spiral-wound filtration membrane (ii) a fiberglass-reinforced roving wound around the plurality of leaves in the uniform direction and attached or cured to itself, thereby enveloping the pleated, tapered, and spiral-wound filtration membrane; or (iii) a pre-formed sleeve or conical cylinder positioned around the pleated, tapered, and spiral-wound filtration membrane.

15. The spiral-wound cross-flow filter element of claim 12, further comprising permeate spacers located within each leaf.

16. The spiral-wound cross-flow filter element of claim 12, further comprising feed spacers located between each leaf.

17. The spiral-wound cross-flow filter element of claim 12, further comprising:
a first anti-telescoping device attached to an inlet end of the permeate tube; and
a second anti-telescoping device attached to and outlet end of the permeate tube;
wherein the first anti-telescoping device and the second anti-telescoping device comprise an inner ring, an outer ring, and radial struts extending between the inner ring and the outer ring.

18. The spiral-wound cross-flow filter element of claim 17, wherein the outer ring of the second anti-telescoping device has a larger radial dimension than the outer ring of the first anti-telescoping device.

19. The spiral-wound cross-flow filter element of claim 17, wherein the first anti-telescoping device has a larger diameter than the second anti-telescoping device.

20. A cross-flow filter comprising:
a housing;
a permeate tube located within the housing; and
a pleated filtration membrane attached to the permeate tube and located between the permeate tube and the housing, the pleated filtration membrane comprising a plurality of leaves circumferentially spaced around the permeate tube and spiral-wound around the permeate tube in a uniform direction;
wherein each leaf comprises:
an inlet edge;
an outlet edge, wherein the length of the inlet edge is greater than the length of the outlet edge;
a tapered distal edge extending between the inlet edge and the outlet edge; and
a proximal end located adjacent to the permeate tube and comprising two folded proximal edges extending between an inlet end of the pleated filtration membrane and an outlet end of the pleated filtration membrane.

21. The cross-flow filter of claim 20, wherein the housing comprises a cylindrical-shaped inner surface surrounding the permeate tube and the pleated, tapered, and spiral-wound filtration membrane.

22. The cross-flow filter of claim 20, wherein the housing comprises a conical-shaped inner surface surrounding the permeate tube and the pleated, tapered, and spiral-wound filtration membrane.

* * * * *